(12) United States Patent
Marta

(10) Patent No.: US 12,111,019 B1
(45) Date of Patent: Oct. 8, 2024

(54) ENGINEERING SYSTEM AND METHOD OF AUTOMATIC CONTROLLING OF THE ENERGY EFFICIENT MODE OF PIPELINE TRANSPORTING PROCESS OF FLUID MEDIUM

(71) Applicant: Ion Marta, Philadelphia, PA (US)

(72) Inventor: Ion Marta, Philadelphia, PA (US)

(73) Assignee: Ion Marta

( * ) Notice: Subject to any disclaimer, the term of this patent is extended or adjusted under 35 U.S.C. 154(b) by 0 days.

(21) Appl. No.: 18/445,803

(22) Filed: Feb. 12, 2024

(51) Int. Cl.
| | |
|---|---|
| *F17D 1/14* | (2006.01) |
| *F17D 1/20* | (2006.01) |
| *F17D 3/01* | (2006.01) |
| *F17D 5/02* | (2006.01) |
| *B65G 53/04* | (2006.01) |
| *B65G 53/28* | (2006.01) |
| *B65G 53/30* | (2006.01) |
| *B65G 53/50* | (2006.01) |
| *B65G 53/52* | (2006.01) |
| *F15D 1/02* | (2006.01) |

(52) U.S. Cl.
CPC ............... *F17D 1/14* (2013.01); *F17D 1/20* (2013.01); *F17D 3/01* (2013.01); *F17D 5/02* (2013.01); *B65G 53/04* (2013.01); *B65G 53/28* (2013.01); *B65G 53/30* (2013.01); *B65G 53/50* (2013.01); *B65G 53/52* (2013.01); *B65G 53/526* (2013.01); *F15D 1/02* (2013.01)

(58) Field of Classification Search
CPC ..... F17D 1/14; F17D 1/20; F17D 3/01; F17D 5/02; F15D 1/02; B65G 53/04; B65G 53/28; B65G 53/30; B65G 53/50; B65G 53/526; B65G 53/52

USPC ... 137/565.01, 2, 12, 815, 822, 282, 565.13, 137/565.33, 599.01; 417/18, 19, 149, 417/170, 176, 189, 282, 300, 301, 478; 406/12, 14, 26, 85, 192, 197, 198
See application file for complete search history.

(56) References Cited

U.S. PATENT DOCUMENTS

| | | | | |
|---|---|---|---|---|
| 1,231,327 | A * | 6/1917 | Brauchler | B65G 53/66 |
| | | | | 406/106 |
| 1,868,621 | A * | 7/1932 | Wolff | F04F 5/467 |
| | | | | 417/191 |
| 3,539,275 | A * | 11/1970 | Frazier | F04F 5/44 |
| | | | | 417/189 |

(Continued)

*Primary Examiner* — Minh Q Le

(57) ABSTRACT

An engineering system, comprising a pumping system, a wave system, a system of measuring devices, and a dynamic controller, configured for generating pressure waves with controlled frequencies, and their propagating through turbulent flow in the suction and discharge pipelines of the pumping system. The engineering system performs a method of automatic controlling the energy efficient mode of pipeline transporting of fluid medium. The dynamic controller regulates and adjusts in real time optimal values of frequencies of generating pressure waves, providing minimum values of hydrodynamic resistance of turbulent flow in the discharge pipeline, for any average value of the flow velocity, compared to the hydrodynamic resistance of the turbulent flow having the same velocity, but not interacting with pressure waves. Automatic controlling the process of generating pressure waves with optimal frequencies by the dynamic controller, ensures the maximum energy efficiency of the process of pipeline transporting of fluid medium.

6 Claims, 12 Drawing Sheets

(56) References Cited

U.S. PATENT DOCUMENTS

| | | | | |
|---|---|---|---|---|
| 3,574,409 | A * | 4/1971 | Furstenberg | B65G 53/06 |
| | | | | 406/3 |
| 4,171,852 | A * | 10/1979 | Haentjens | B65G 53/30 |
| | | | | 417/322 |
| 4,247,262 | A * | 1/1981 | Lipstein | G21C 15/25 |
| | | | | 417/54 |
| 4,595,344 | A * | 6/1986 | Briley | F04F 5/48 |
| | | | | 417/189 |
| 4,762,148 | A * | 8/1988 | Marui | B65G 53/526 |
| | | | | 241/26 |
| 6,827,528 | B1 * | 12/2004 | Relin | B65G 23/00 |
| | | | | 406/197 |
| 10,233,952 | B1 * | 3/2019 | Marta | F15D 1/02 |
| 2009/0175734 | A1 * | 7/2009 | Joshi | F15B 21/047 |
| | | | | 417/300 |
| 2015/0023809 | A1 * | 1/2015 | Yamada | F04F 5/463 |
| | | | | 137/833 |

* cited by examiner

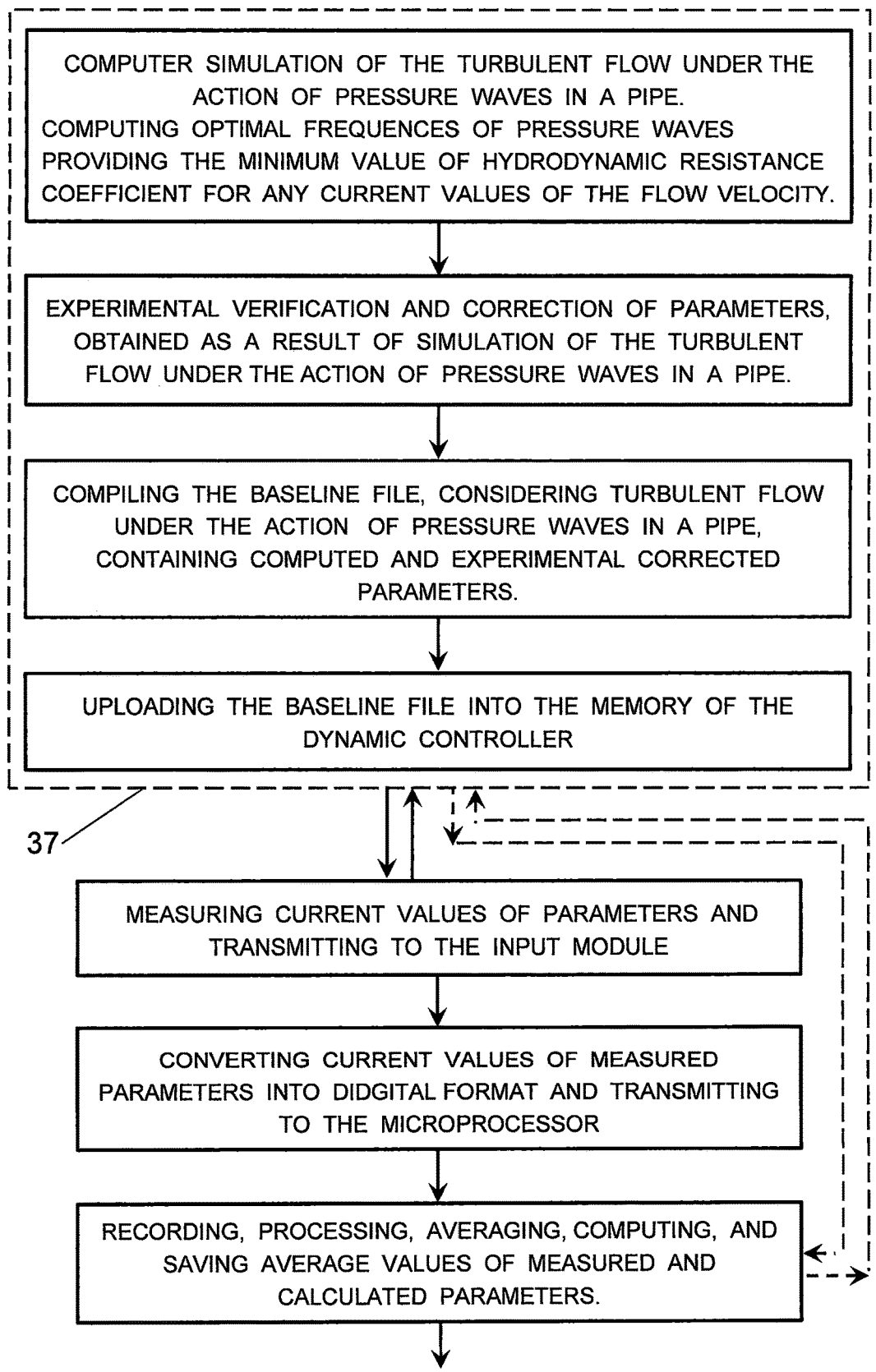
FIG. 12, a.

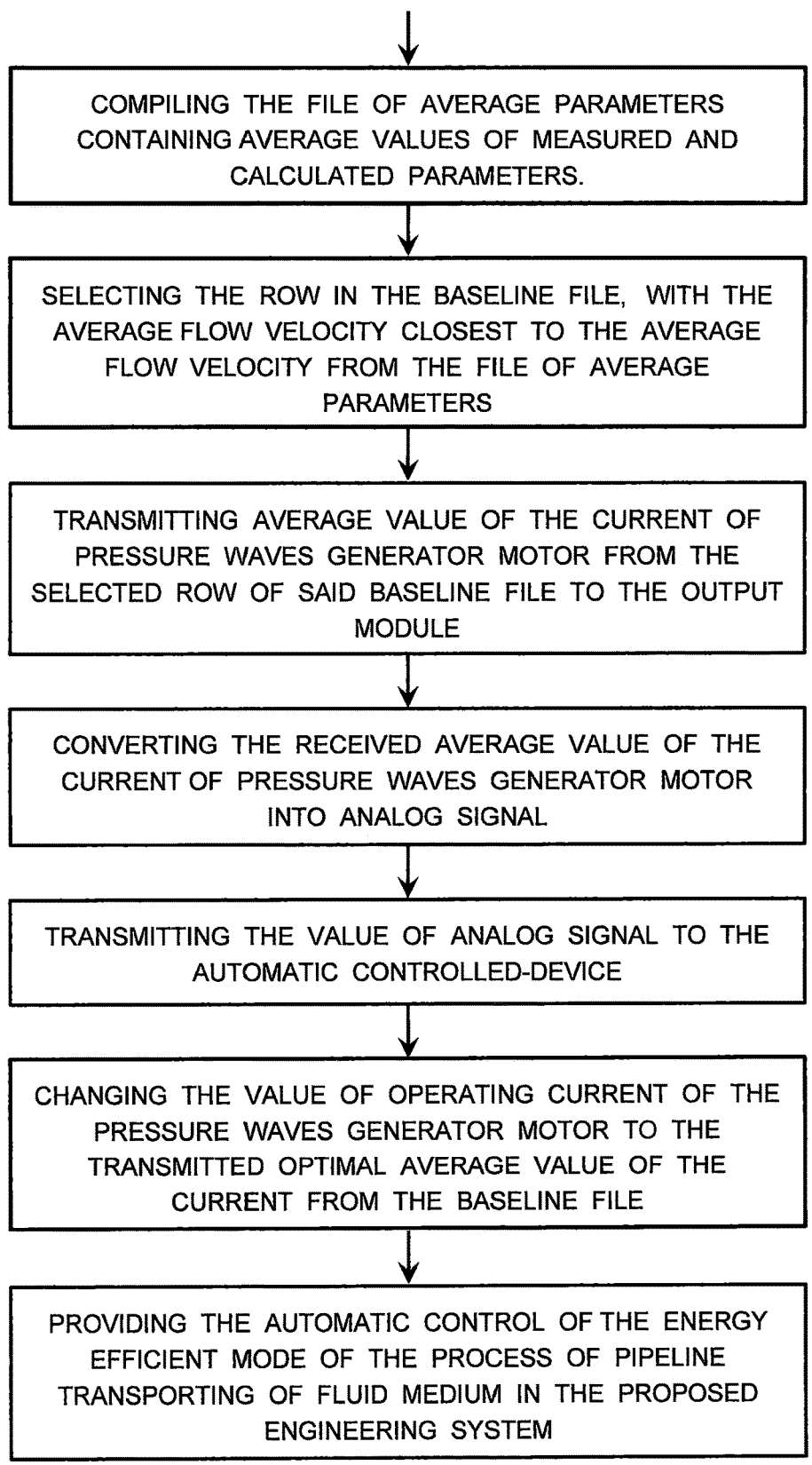
FIG. 12, b.

ENGINEERING SYSTEM AND METHOD OF AUTOMATIC CONTROLLING OF THE ENERGY EFFICIENT MODE OF PIPELINE TRANSPORTING PROCESS OF FLUID MEDIUM

TECHNICAL FIELD

This invention relates generally to technology of pipeline transporting process of fluid medium. Particularly, the invention relates to an engineering system and a method of automatic controlling of the energy efficient mode of pipeline transporting process of fluid medium. The proposed method can also be used for pipeline transporting of technological media, powders, brains, whose solid phase can sediment on the inner surface of the pipe; filtration systems.

BACKGROUND OF THE INVENTION

The present invention relates generally to pipeline transportation technology of fluid medium. Particularly, the invention relates to an engineering system providing the automatic controlling of the energy efficient mode of pipeline transporting process of fluid medium.

The physical idea of providing the energy efficient mode of the process of pipeline transporting of fluid medium is based on one of the fundamental physical phenomena that is the decrease of hydrodynamic resistance during the interaction of turbulent flow and pressure waves of relatively small amplitude p, infra-low frequency f and a suitable form, in a discharge pipeline. The waveform is defined as a law of change of pressure over time, $P^-(t)$, during a period T; t is the time, an independent argument. A front time, $t_F$, is the time interval during which pressure in a wave is increased from zero to a maximum value, by the given law, $P^-_F(t)$; during the back time, $t_B$, pressure in the wave is restored from a maximum value, $P^-(t_F)$ to zero, by the given law $P^-_B(t)$; $t_F+t_B=T$; $P^-(t)=P^-_F(t)+P^-_B(t)$, $t=0 \ldots T$. Laws $P^-_F(t)$ and $P^-_B(t)$ can be different. The pressure wave is symmetric if a ratio $\alpha=t_F/T=\frac{1}{2}$, and $P^-(t)$ is an even function on the time interval T. Otherwise, $\alpha \neq \frac{1}{2}$, a pressure wave is asymmetric; details, U.S. Pat. No. 10,233,952.

As a result of such interaction, significant changes in the structure of turbulence of the core flow and boundary layer occur: turbulence suppression; decrease in friction stress on the wall; anisotropization of turbulence in the flow direction; forming coherent structures; partial laminarization etc. In the end, all these phenomena lead to decrease of the turbulent viscosity, hydrodynamic resistance coefficient, Aw of the perturbed flow, and of the energy consumption of pipeline transporting process of fluid medium. The perturbed flow is defined as the turbulent flow interacting with pressure perturbations or pressure waves propagating along the flow.

The energy mode of the pipeline transporting of fluid medium interacting with pressure waves, during which the specific energy consumption per unit volume of the transported medium is minimum, is called the energy efficient mode. The dynamic state of such turbulent flow has a minimum value of hydrodynamic resistance, and corresponds to optimal parameters of the pressure waves: an amplitude, $P^-(t_F)_{opt}$, a frequency, $f_{opt}$, and a form, $P(t)_{opt}$, $t=0 \ldots T$.

Practical implementation of the energy efficient mode in industrial pipelines for transportation of fluid medium is realized in a system consisting of the next basic components: a pump, with a suction and a discharge pipelines, and a pressure waves generator (PWG) connected parallel to a pump, to the suction and the discharge pipelines. Both components form a system configured for providing stable generating pressure waves of the controlled parameters and their propagating through the flow along the suction and discharge pipelines.

The process of transporting fluid medium through an industrial pipeline is accompanied by a weak trend, changes in pressure and flow rate. Even for a constant flow rate, these changes exist and slightly change the structure of the flow turbulence and boundary layer. More significant changes of the flow rate in the pipeline, for example, due to technological needs of customers, which vary randomly in time and magnitude, are accompanied by more significant changes in pressure, structure of the flow turbulence and boundary layer, and of hydrodynamic resistance coefficient. For simplicity, consider an isothermal flow of fluid medium.

Thus, a medium flow, transporting through the pipeline is a dynamic system, the state parameters of which, flow velocity and pressure, are continuously changing over time. As a result, the structural parameters of the flow: turbulence intensity and spectrum of turbulent pulsations, the boundary layer, and consequently the dynamic coefficient of turbulent viscosity, also are changing overtime.

Such a dynamic state of turbulent flow is not related to the type of the pump, pumping fluid medium through a pipeline. It is typical for any type of the pump. For example, experimental research shows, that a pump with a constant rotor speed, installed in a laboratory hydrodynamic loop, provides a quasi-steady flow rate with a very low frequency trend. The same physical picture is observed with the discharge pressure in the discharge pipeline.

State parameters of the transporting flow, pressure in the discharge pipeline, and flow velocity, remain in the dynamic state when external perturbations are exerted on the flow.

Experimental and theoretical studies of the action of perturbations on a turbulent flow in a pipeline aimed at decreasing hydrodynamic resistance are quite diverse. Examples include: the perturbing the flow energy, the flow velocity by means of spanwise or streamwise oscillations of a canal wall or by azimuthally-symmetric oscillations of a pipe wall around the longitudinal axis; the perturbing of boundary layer by means of artificial turbulators set on the inner surfaces of the pipes. However, in practice the most acceptable is the method of pressure perturbation. Firstly, because the energy of pressure perturbation waves of suitable parameters is controlled during the process of generating pressure waves. Secondly, the energy of pressure waves affects both the turbulence structure of the core and boundary layer of the flow. Thirdly, the low frequency pressure waves propagate through the pipe without any obstacles.

Theoretical studies are related to the identification of the mechanisms of action of the given type of perturbation on the turbulent flow and the boundary layer, and the quantitative calculations of the reduction in hydrodynamic resistance. The experimental and theoretical results are enough and serve as a basis for their practical application in the technology of pipeline transporting of medium flow in the energy efficient mode. It was revealed that, under certain parameters of the pipe, flow rate, and pressure perturbations, drag reduction is over 12% of the amplitude forcing the largest scale mode. At that, 2% consists from the energy consumption for creating perturbations and 10% net energy saving. Energy consumption for creating perturbations can be different and considerable depends on the design of the source. For example, the use of PWG in the laboratory hydrodynamic loop, for experimental research, shows that the power of pressure waves generator is less than 1% of the pump power.

Experimental studies carried out on pipes of practical values of diameter and water flow rates when an oscillating flow is superimposed to a stationary flow, show the wall shear stress can be increased, decreased, or maintained as in a stationary flow. Theoretical research performed for the same pipes, and values of the flow rate, show that for some oscillating flow parameters decrease of the hydrodynamic resistance reaches 33%.

More detailed results of theoretical simulation and experimental studies of the mechanisms of interaction of pressure waves with turbulent flow in a pipe, leading to decrease in hydrodynamic resistance, are presented in the references section.

An analysis of the results in this area shows, that all studies are carried out at constant average values of the state parameters of the flow and of the pressure perturbations; there is no statement of the engineering problem for optimizing pressure waves parameters, frequency, amplitude, and waveform, interacting with the turbulent flow in a pipe, for providing sufficient decrease of hydrodynamic resistance to be applied in engineering applications.

The above presented results and references related to interaction of pressure waves and turbulence in a pipe, have been obtained for the constant state of parameters of the flow, and symmetrical pressure waves.

It should be noted that the quantitative results of decreasing the hydrodynamic resistance of the transported medium, when interacting with pressure waves aimed to decrease the energy consumption are sufficient to be applied in pipeline transportation technology.

Since in the specification only one type of waves is used, "pressure waves", the word "pressure" frequently is omitted, but is certainly implied.

Analysis of the energy efficiency of the practical application of the above effects of reducing hydrodynamic resistance, is based on the balance equation of the pump power. Energy efficiency $E_f$, of the process is a quantity of energy needed to transporting a given volume of fluid medium along the pipeline with the given flow rate, defined by the formula:

$$E_f = \frac{N_p \Delta \tau_G}{V}. \quad (1)$$

$N_P$ is the pump power, V is the volume of fluid medium pumped during the time interval $\Delta_{\tau G}$ with the volumetric flow rate, G: $V=G*\Delta\tau_G$. The less is $E_f$, the higher is the energy efficiency for the same V. Being applied to one cubic meter, the expression (1) defines the specific energy consumption.

To simplify the power balance equation and to keep the physical meaning of the components we assume the incompressible fluid.

Let us consider, qualitatively, the energy advantages of the practical application of the effect of decreasing hydrodynamic resistance under the action of pressure waves, in the process of pipeline transporting of a fluid medium. To do this, we will use the pump power balance equation and a comparative analysis of the power components for the proposed and traditional pipeline transporting processes.

Consider a discharge pipeline of the given configuration with a diameter D, and a length, L from the pump outlet to the pipeline outlet cross section, through which a fluid medium with a volumetric flow rate G is flowing. The pump power providing a given volumetric flow rate, G through the mentioned pipeline is calculated by using the formula:

$$N_P = \left[\frac{8\rho G^2}{\pi^2 D^4} + \rho g h + \lambda \frac{L}{D} * \frac{8\rho G^2}{\pi^2 D^4} + \zeta * \frac{8\rho G^2}{\pi^2 D^4}\right] * G, \quad (2)$$

where λ is the hydrodynamic resistance coefficient calculated by Darcy-Weisbach friction factor:

$$\lambda = \frac{1.325}{\left[\ln\left(\frac{e}{3.7*D} + \frac{5.74}{Re^{0.9}}\right)\right]^2}. \quad (3)$$

ζ is the local hydrodynamic resistance coefficient, ρ is the flow density, g is the acceleration of gravity, h is the pipeline elevation, θ is the pipe roughness, Re=vD/ν is the Reynolds number, v=G/S is the flow velocity, S is the cross-sectional area of the pipe where the flowmeter is installed, ν is the coefficient of kinematic viscosity of the fluid medium.

An analogical balance equation of the pump power (2), but for the flow interacting with pressure waves, contains additional terms: sources of power, Pw, and $N_e$. They are added on the right side of equality (4). $N_W$ is the power spent by the pump for the process of forming pressure waves and overcoming hydrodynamic and wave resistances in connecting pipes, connecting the PWG with the suction and discharge pipelines, FIG. 1. $N_e$ is the electric power of the PWG motor 9, which is not related to the pump power, but should be included in this balance equation. Suppose, that the power of the pump when pumping the unperturbed and perturbed flows is the same. Then, considering the mentioned power components in the balance equation (2), we obtain the equality:

$$\left[\frac{8\rho G^2}{\pi^2 D^4} + \rho g h + \lambda \frac{L}{D} * \frac{8\rho G^2}{\pi^2 D^4} + \zeta * \frac{8\rho G^2}{\pi^2 D^4}\right] * G = \quad (4)$$

$$\left[\frac{8\rho G_w^2}{\pi^2 D^4} + \rho g h + \lambda_w \frac{L}{D} * \frac{8\rho G_w^2}{\pi^2 D^4} + \zeta_w * \frac{8\rho G_w^2}{\pi^2 D^4}\right] * G_w + N_w + N_e.$$

Quantities with subscript "w" relate to perturbed flow and their values also depend on the waves parameters. For example: $G_W=G_W(P_{SW}, P_{DW}; f, b, \alpha)$. $P_{SW}, P_{DW}$, are pressures in the suction and discharge pipelines on the pump, respectively. Values of $P_{SW}$ and $P_{DW}$ w are measured by measurement devices (pressure sensors) and depend on the cross-sectional area of the pipe where they are installed.

Simplifying the equality (4), supposing a horizontal and a linear discharge pipeline, h=0 and ζ=0, we obtain:

$$N_w + N_e = k * \left[\left(1 + \lambda \frac{L}{D}\right) * G^3 - \left(1 + \lambda_w \frac{L}{D}\right) * G_w^3\right], \text{ where} \quad (5)$$

$$k = \frac{8\rho}{\pi^2 D^4}.$$

To keep the structure of the Darcy-Weisbach friction factor in relation to the perturbed flow by pressure waves $P^-(t)$, it is necessary to introduce a modified dimensionless of hydrodynamic resistance coefficient, that depends not only on the pipe roughness and Reynolds number, (3), but also on the frequency, amplitude, and waveform, $\lambda_w = \lambda_w$ (Re w, e; $f$, b, α).

Expression (5) can be used for estimation of the winning of energy during the process of pipeline transporting of flow medium. The winning of energy is determined not only by decreasing of the hydrodynamic resistance coefficient, λ, but also by changing the flow rate, G.

Consider a qualitative estimation (5) in a specific example. Suppose that water flows with the velocity of 8.202 ft/s through the discharge pipeline with the length 3281 ft and diameter of 4 inches; Re=50800, G=267.5 gpm.

Assume, that under the influence of pressure waves, not of the optimal parameters, the hydrodynamic resistance coefficient, Aw is decreased by 5%, that is, $\lambda W = 0.95 * \lambda$. For simplicity, let us assume that the water flow rate is equal to $G_W$. Then, the estimated power difference on the right side of (5) is approximately 700 W. The difference between the left and the right sides of the power balance equation (5) is the net winning of power, or energy.

That is, the winning of energy is provided only by reducing the hydrodynamic resistance coefficient. It is this idea that underlies the method of transporting medium flow through pipeline in the energy efficient mode. Its essence consists in the:

1. determining the optimal parameters of pressure waves, amplitude, frequency, and form, interacting with the turbulent flow in a pipeline in such a way, as to provide the minimum value of the hydrodynamic resistance coefficient, corresponding to current value of the flow rate, in the real time mode;
2. providing the automatic controlling of pressure waves generating process with optimal parameters in the real time mode, to maintain minimum value of the hydrodynamic resistance coefficient at any changes of the current values of the flow rate over time.

The proposed analysis of energy advantages of the process of transporting fluid medium through pipelines in the energy efficient mode allows for the following conclusion:

practical implementation of the process of transporting of fluid medium through pipelines interacting with pressure waves, comes down to developing a method of automatic controlling of the process for generating pressure waves with optimal parameters, providing the minimum value of the hydrodynamic resistance coefficient of the current value of the flow rate, corresponding to the energy efficient mode, which is disclosed in the present invention.

Note. The using of terms "flow rate" and "flow velocity".

Both terms appear in scientific and engineering literature. The term "flow rate" is predominantly used in the engineering literature. Devices for measuring flow rate, flow meters, are of high-precision in a wide range of measurements. They also use a variety of physical principles of measuring.

These advantages allow measurement devices to be successfully used not only in the technology of pipeline transportation of various neutral and chemically aggressive fluid media, but also in laboratory hydrodynamic research.

The term "flow velocity" is predominantly used in scientific literature. This is one of the basic physical parameters defining the flow state. The continuous process of generating turbulent pulsations velocity is powered from the energy of the main flow. For example, the velocity of an elementary fluid particle vi in the turbulent flow is represented as: $vi = v_i^- + v'_i$, where $v_i^-$ is the average flow velocity, and $v'_i$ is the velocity pulsation. For Cartesian coordinates, i=x, y, z.

It is these pulsation quantities that affect the change in the structure of the turbulent flow, the occurrence of additional turbulent stresses, turbulent viscosity, and other transport phenomena. Quantitatively, all these phenomena are determined by the intensity of turbulent pulsations velocity, that depend on the main flow velocity. Therefore, for the theoretical description of turbulent flow, as well as for computer modeling, the physical quantity "flow velocity" is used. It should be understood, that if the "flow rate" is used in formulas and analysis in the Specification, similar functional relationships and analysis relate to the "flow velocity". For example, simulation of the interaction between turbulent flow and different perturbations (energy, pressure, velocity), aimed at revealing the mechanisms of interaction between perturbations and turbulent flow which lead to decrease of hydrodynamic resistance coefficient, is described by using the term "flow velocity". Author hopes that the reader will understand the correct use of the terms "flow rate" and "flow velocity" in the description and claims. At the same time, in the opinion of the author, the qualitative physical interpretation presented schematically in FIGS. 6 and 7, becomes more understandable using the flow rate axis.

SUMMARY OF THE INVENTION

The present invention disclosed and claimed herein comprises an engineering system and method of automatic controlling of the energy efficient mode of pipeline transporting process of fluid medium. In such architecture an engineering system comprising interconnected a pumping system, a wave system, a system of measurement devices, and a feedback dynamic controller, is proposed for the first time.

A pumping system, comprising a pump, connected to a motor, suction and discharge pipelines configured for pipeline transporting of fluid media.

It is successfully used in the transportation of homogeneous and heterogeneous media in various fields of technologies. Moreover, the ratio of cross-sectional areas of the connecting pipe and the discharge pipeline is less than 0.04.

The wave system, comprising a PWG, a motor of the PWG, and connecting pipes, is configured for generating pressure waves.

The system for generating pressure waves consists from interconnected pumping system and wave system. The pressure waves generator is connected parallel to the pump, to the suction and discharge pipelines. This configuration of interconnected pumping and wave systems, during their joint operation, allows generating pressure waves of the controlled frequencies and amplitudes, and providing their propagation through the suction and discharge pipeline. Regulation of the frequency, and amplitude of the generated waves, is carried out by changing the speed of the motor of the PWG and is aimed at decreasing the hydrodynamic resistance of the turbulent flow, at any current value of the flow velocity. The essence of this adjustment is to provide and maintain in real-time mode the minimum value of the hydrodynamic resistance coefficient, at any current value of flow velocity in the discharge pipeline. Maintaining this internal state of the turbulent flow requires continuous measurements of its parameters and continuous adjustment of the wave's frequency by PWG.

The system of measurement devices consists of measuring devices, installed on the elements of the system for generating pressure waves. The measurement devices are configured to continuously providing measuring of instantaneous values of the state parameters of turbulent flow, velocity and pressure, the motor of PWG, the frequency of generated waves, and the current values of operating parameters. The values of measured parameters are transmitted to the input module of a dynamic controller.

Measuring the pump parameters, speed of the impeller, pressures in the nuzzles, current and speed of the pump motor, is necessary to calculate energy efficiency or specific energy consumption in accordance with formula (1) for a given time interval. These parameters are determined and recorded in the baseline file, during installation of the dynamic controller on the pumping station and are applied only to the specified pump.

A dynamic controller is a system for automatically controlling the energy efficiency mode of the process of pipeline transportation of fluid medium in real time. The dynamic controller is connected to the feedback of a system for generating pressure waves. The basic components of the dynamic controller are a microprocessor, a memory, a programming device, an input module, an output module, and output-controlled devices. The input module is connected to measurement devices and microprocessor. This module is designed for receiving current values of measured parameters from measurement devices, converting into the digital format, and transmitting to the microprocessor. The microprocessor is interconnected with the input module, the memory, the programming device, and the output module. The output module is connected to output controlled-devices. The advantage of such interconnection between the components of the dynamic controller allows one to adjust parameters of the control function, corresponding to the current state parameters of turbulent flow in the discharge pipeline. Additional non-essential correction of the wave amplitude, if necessary, is carried out using the valve opening angle of the controlled valve installed on the connecting pipe.

The beginning of the method is performing the modeling of interaction of pressure waves with the turbulent flow of the current medium in the pipeline, in order to determine the average values of frequencies, that provide the minimum value of the hydrodynamic resistance coefficient, in the entire practical range of the flow velocity. Next, the experimental correction of said frequencies and hydrodynamic resistance coefficient in a discrete set of average flow velocities covering entire practical range is performed. As a result, a main file is compiled, containing the specified discrete set of average velocities, frequencies of pressure waves, and hydrodynamic resistance coefficient, which is uploaded into the memory of the dynamic controller. This file forms the baseline file for the programmatic execution of the process of automatic controlling of the energy efficient mode.

The microprocessor receives, records, processes, calculates, and saves the received measured parameter values from the input module. Next, it performs averaging the obtained parameter values after each specified averaging time interval. The microprocessor compiles a file of average parameters, on which only the average values of the measured and calculated parameters are recorded in a certain sequence. As soon as a set of the last updated average parameter values is recorded, the program searches and selects such a row in the baseline file, in which the average value of the flow velocity is closest to the last updated average value of the flow velocity from the file of average parameters. The average value of the current of motor of PWG, from the corresponding cell of the selected row is transmitted to the output module. Next, it is converted into an analog signal and transmitted to an automatic-controlled device which changes value of the operating current of the motor of PWG to the transmitted optimal average value of the current from the baseline file, corresponding to current value of the flow velocity, optimal frequency, minimum value of the hydrodynamic resistance coefficient. These parameters provide the energy efficient mode during the specified averaging time interval. If the average flow velocity from the next updated set of average parameters does not differ significantly from the current one, then the current in the motor of the PWG does not change during the next averaging time interval. If the average value of the flow velocity from the next updated set of average parameters differs significantly from the current one, then the program searches for the closest average value of the flow velocity from the baseline file and then performs all the steps described above to adjust the optimal frequency of the generated pressure waves, providing the energy efficient mode.

The advantage of the proposed method is that it can be used on existing pumping stations by simply connecting a PWG parallel to the pump and adding a dynamic controller with an already uploaded baseline file in memory.

New pumping systems can be designed according to the proposed architectural scheme of the engineering system for pipeline transporting of fluid medium in energy efficient mode.

BRIEF DESCRIPTION OF THE DRAWINGS

To facilitate a complete understanding of the proposed invention, it is useful to simultaneously analyze the text of the Detailed Description and accompanying the proposed drawings.

FIG. 12, a-b is a flowchart illustrating a method of automatic controlling of the energy efficient mode of the process of pipeline transporting of fluid medium operation with the use of the engineering system of FIG. 2.

DETAILED DESCRIPTION OF THE INVENTION

The current invention provides an engineering system and method of automatic controlling of the energy efficient mode of pipeline transporting process of fluid medium.

The detailed description offered below does not consider all the details of each of the systems that comprise the engineering system, but sufficient, for understanding the operation of the engineering system. In the detailed description of the method, some nonessential actions are also omitted, which do not affect the essence and sequence of the steps of the practical realization of the method.

In modern pumping systems the pipeline transportation of fluid media is carried out by a pump that provides a stationary pressure gradient along the discharge pipeline.

Attempts to decrease the hydrodynamic resistance of the turbulent flow in a pipeline with the use of a source of additional perturbations of the flow velocity or pressure, such as artificial turbulators installed on the inner surfaces of the pipes that have a local effect. Therefore, they did not find industrial applications.

The use of negative modulation of the flow-forming energy makes it possible to generate the controlled pressure waves of small amplitudes and low frequencies, and ensure their propagation through the flow of the transported medium in long pipelines.

The interaction of pressure waves of suitable amplitudes and frequencies with the turbulent medium flow in the pipeline, ensures a decrease in hydrodynamic resistance. Therefore, the development of a method for automatic controlling of the energy efficiency of the process of pipeline transporting of flow medium by controlling amplitudes and frequencies of generated pressure waves is fundamental for industrial applications.

To facilitate a complete understanding of the proposed invention, it is useful to study simultaneously the text of the Detailed Description, accompanied by the proposed drawings.

The current invention provides an engineering system and a method of automatic controlling of the energy efficient mode of pipeline transporting process of fluid medium. The engineering system, performing the energy efficient mode, is designed for pipeline transportation of fluid medium and comprises the following interconnected systems: a pumping system; a wave system; a system for generating pressure waves; a system of measurement devices; a dynamic controller.

Figure 1:
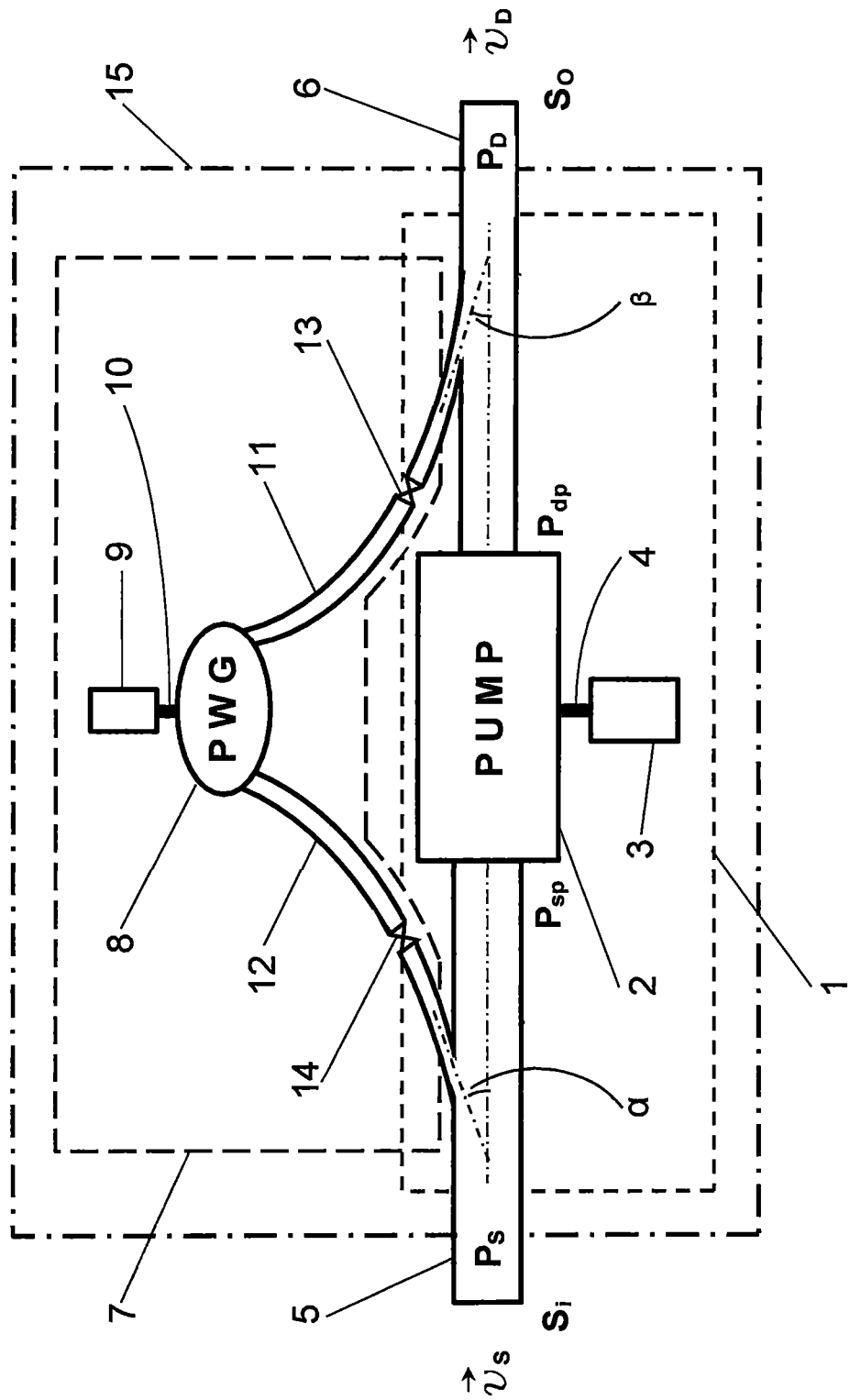
FIG. 1 is a schematic representation of the system of generating pressure waves 15, formed from the interconnected pumping system 1 and wave system 7.
Figure 2:
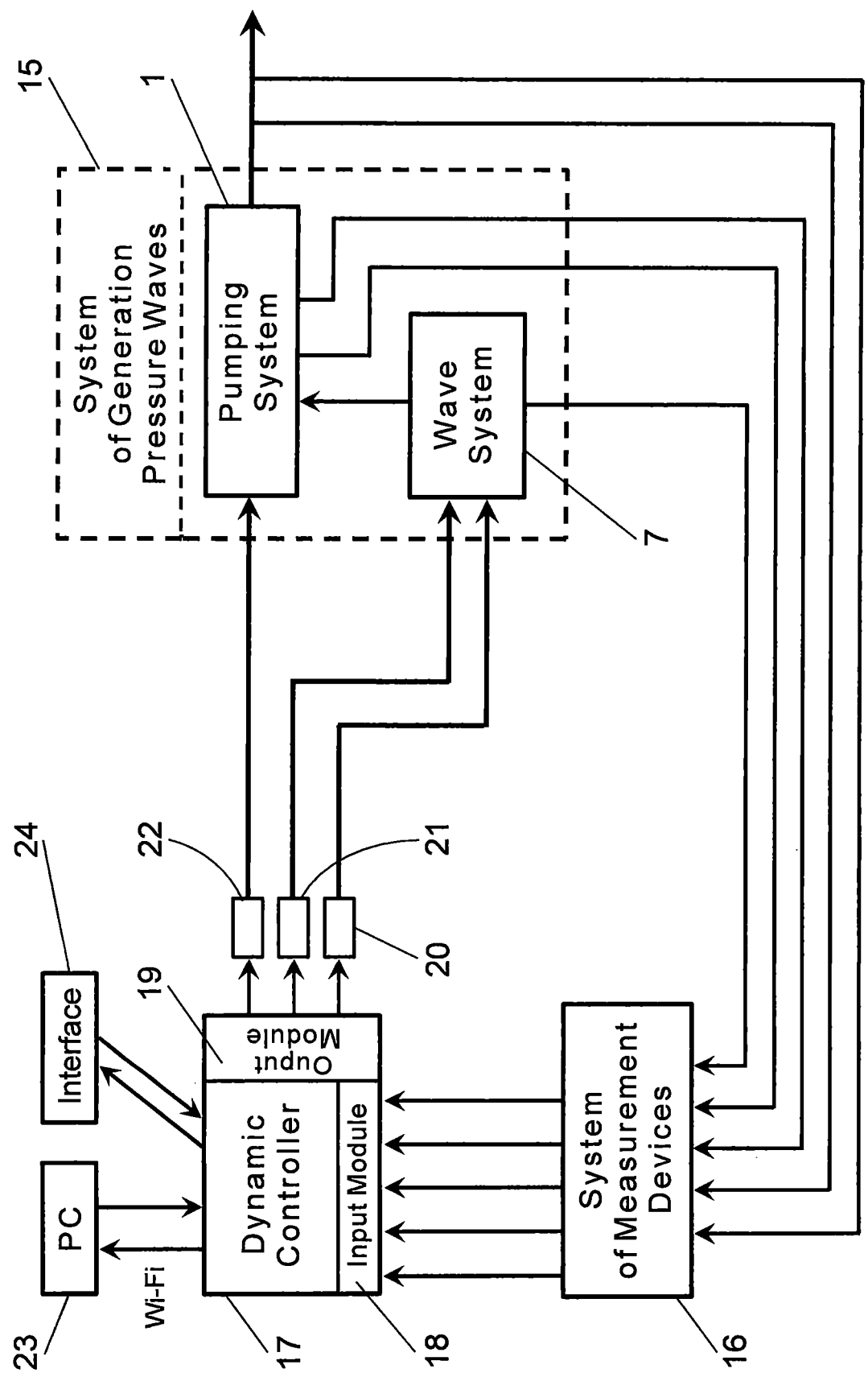
FIG. 2 is an architectural scheme of the engineering system for pipeline transportation of fluid medium in energy efficient mode.

FIG. 2 is an architectural scheme of an engineering system for pipeline transporting of fluid medium in an energy efficient mode. The main system in the pumping system 1, whose structure is shown in FIG. 1. The pumping system comprises a pump 2, a motor 3, a shaft 4, a suction pipeline 5 connected to an inlet of the pump, and a discharge pipe 6 connected to an outlet of the pump. The pump 2, connecting shaft 4, and motor 3, form a pump unit.

A wave system 7, FIG. 1 comprising a pressure waves generator 8, a motor 9, a shaft 10 connecting the motor with the PWG, and connecting pipes 11 and 12 with control valves 13 and 14, connected to the discharge and suction pipelines of the system 1. The PWG 8, motor 9 and connecting shaft 10 form a wave unit.

The wave system is designed to provide the set dynamic law of change of connecting surface over time, $S_C(t)$ during a period, T. The law $S_C(t)$ defines the law of change of pressure over time in the generated wave, $P^-(t)$.

Calculated values of parameters of the generated waves depend on:
  physical properties of the fluid medium (density $\rho$, viscosity $v$, compressibility $\beta$, temperature $t_f$);
  operating parameters (flow velocity $v$, suction pressure $P_{sp}$, and discharge pressure $P_{dp}$ on the pump);
  geometrical parameters (diameters of the suction and discharge pipeline and of connecting pipes).

Based on these parameters, the geometric shapes, and sizes of profiles of the openings in the walls of coaxially located cylindrical elements of the PWG are selected and calculated. During rotation of the inner cylinder relative to the outer cylinder, the intersection of the surfaces of the specified openings is carried out (details, U.S. Pat. No. 10,233,952). As a result of such intersecting, a connecting surface is formed, $S_C(t)$. It connects two volumes belonging to PWG: inner, with the suction pressure, $P_S$ and outer, with the discharge pressure, $P_D$. During the frontal time, $t_F$ the value of connecting surface increases from zero to maximum value, of the given law, $S_F(t)$: t=0 . . . $t_F$. During the back time, $t_B$ the value of connecting surface decreases from maximum value to zero, according to a given law, $S_B(t)$: t=$t_F$ . . . T. The law of change of the connecting surface $S_F(t)$ and $S_B(t)$ over time, pressures $P_S$ and $P_D$, and a speed of the PWG motor, $\omega$ define the law of change of pressure over time in the generated pressure waves, $P^-_F(t)$ and $P^-_B(t)$, t=0 . . . $t_F$ . . . T.

A compression wave is generated in a similar way.

A system for generating pressure waves comprising the interconnected pumping system 1 and the wave system 7, schematically presented in the FIG. 2. PWG 8 is connected parallel to the pump 2 through connecting pipes, 11 and 12, to the discharge 6 and suction 5 pipelines. Such configuration is designed to provide the generating pressure waves, and to propagate through the flow, along the connecting pipes 11 and 12, and onward, along suction and discharge pipelines, 5 and 6. During the process of pipeline transporting of fluid medium, in the suction and the discharge pipelines, average pressures <$P_S$> and <$P_D$>, and flow velocities, <$v_S$> and <$v_D$>, are established correspondingly. Thus, the necessary condition for generating pressure wave is the inequality: $P_D$>$P_S$.

Physical meaning and design choice of the slope angles $\alpha$ and $\beta$ between connecting pipes 12 and 11 and the suction and discharge pipes, 5 and 6 respectively, are presented by B. Pierre ("Pressure Waves in Pipelines and Impulse Pumping. Physical Principles, Model Development and Numerical Simulation", Department of Petroleum Engineering and Applied Geophysics, Norwegian University of Science and Technology, Trondheim, December 2009).

The process of generating waves is carried out as follows: suppose, that at the initial moment of time the value of the connecting surface is zero, $S_C(t)$=0. When the motor 3 of a pump 2 is turned on, this system operates as a traditional pumping system 1 for transporting of fluid medium through the suction pipeline 5, the pump 2, and the discharge pipeline 6. When the PWG 8 is turned on, connecting surface becomes greater than zero, changes over time, linking volumes of medium with different pressures: inner volume with the suction pressure, $P_S$ and outer volume with the discharge pressure, $P_D$. As a result of connecting volumes, an exchange of pressure impulse between them occurs. This process is accompanied by the simultaneous formation of compression and rarefaction pressure waves. The compression pressure wave $P^+(t)$ propagates through the connecting pipe 12 in the suction pipeline 5; the rarefaction pressure wave $P^-(t)$ propagates through the connecting pipe 11 in the discharge pipeline 6. A compression pressure wave, $P^+(t)$ is forming relatively to the suction pressure, $P_S$, a rarefaction wave, $P^-(t)$ is forming relatively to the discharge pressure, $P_D$, FIG. 3. Pressure waves $P^-(t)$ and $P^+(t)$ are generated only as a result of negative modulation of the flow-forming energy (details, U.S. Pat. No. 8,573,896). Physically, this means that a small part of the potential energy of the compressed flow, is converted into the wave energy, using the pump 2 and PWG 8, and is introduced back into the discharge flow. The turbulent flow generated this way is a perturbed weak wave flow.

Figure 4:
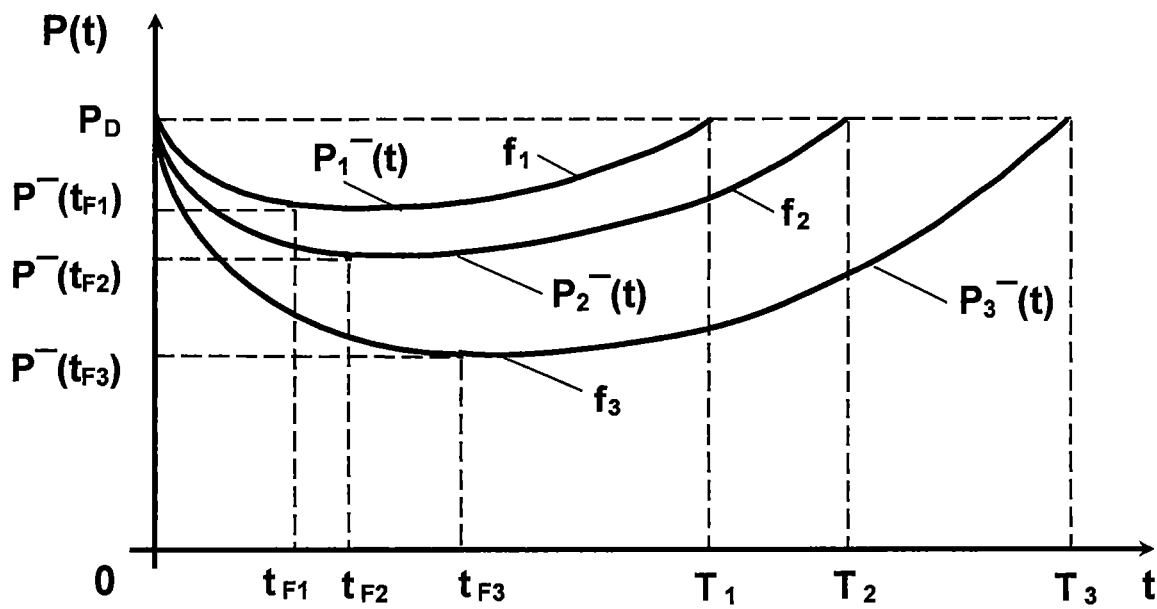
FIG. 4 is a schematic representation of an example of the change of pressure vs frequency in the asymmetric rarefaction pressure wave $P^-(t)$.

When the waves frequency changes, at constant pressures $P_S$ and $P_D$ between zones, the wave amplitude changes too. Indeed, the estimated value of the exchange of pressure impulse, passing perpendicularly to connecting surface $S_C(t)$ is:

$$I_p \sim \int_0^T [P_D - P_S] * \frac{S_C(t)}{S_{max}}, \quad (6)$$

where $S_C(t)$ is the law of change of connecting surface over time during the period T, $S_{C(max)}$ is the maximum value of the connecting surface, corresponding to the maximum value of the pressure amplitude in the generated wave. FIG. 4 shows an example of a qualitative graphical interpretation of a rarefaction wave. Indeed, the amplitude of the generated pressure waves is inversely proportional to frequency, $f$: $P^-(t_F) \sim 1/f$. At the same time, the waveform also changes in each time interval, $[0 \ldots t_F]$ and $[t_F \ldots T]$.

FIG. 4 clearly shows that, for example, a rarefaction wave with a frequency $f_2$, the total pump energy compression, $[0 \ldots P_D]$ is represented as the sum of two components: a constant component, $[0 \ldots P^-(t_{F2})]$ and a wave component, $[P^-(t_{F2}) \ldots P_D]$. The analogic energy structure is maintained for generated waves of any frequencies. Examples are waves with frequencies $f_1$ and $f_3$. The constant components of the pressure are respectively: $[0 \ldots P^-(t_{F1})]$ and $[0 \ldots P^-(t_{F3})]$, and of the wave components are $[P(t_{F1}) \ldots P_D]$ and $[P^-(t_{F3}) \ldots P_D]$.

The dynamic structure of turbulence and boundary layer of a medium flow of a given flow rate, $<G_j> \pm \Delta G(t)$, or flow velocity, $<v_i> \pm \Delta v$, interacting with pressure waves only of certain parameters, $<P^-> \pm \Delta P^-(t)$, $<f> \pm \Delta f(t)$, $<\alpha> \pm \Delta \alpha(t)$, causes the physical effects described above that lead to decrease in the hydrodynamic resistance coefficient, $\lambda_W$. The sign $< >$ means the average value of parameter over a given averaging time interval $\Delta t$, containing a sufficient number of periods of pressure waves; $\Delta G(t)$, $\Delta P^-(t)$, $\Delta f(t)$, and $\Delta \alpha(t)$ are dynamic deviations from the average values of the indicated parameters, during operating engineering system for pipeline transporting of fluid medium.

Automatic control of the feedback between current value of the state of turbulent flow and parameters of generated waves is performed by the dynamic controller. The essence of this control is providing the continuous controlling frequency of generating pressure waves providing the decrease of hydrodynamic resistance of the current value of the flow rate.

Figure 5:
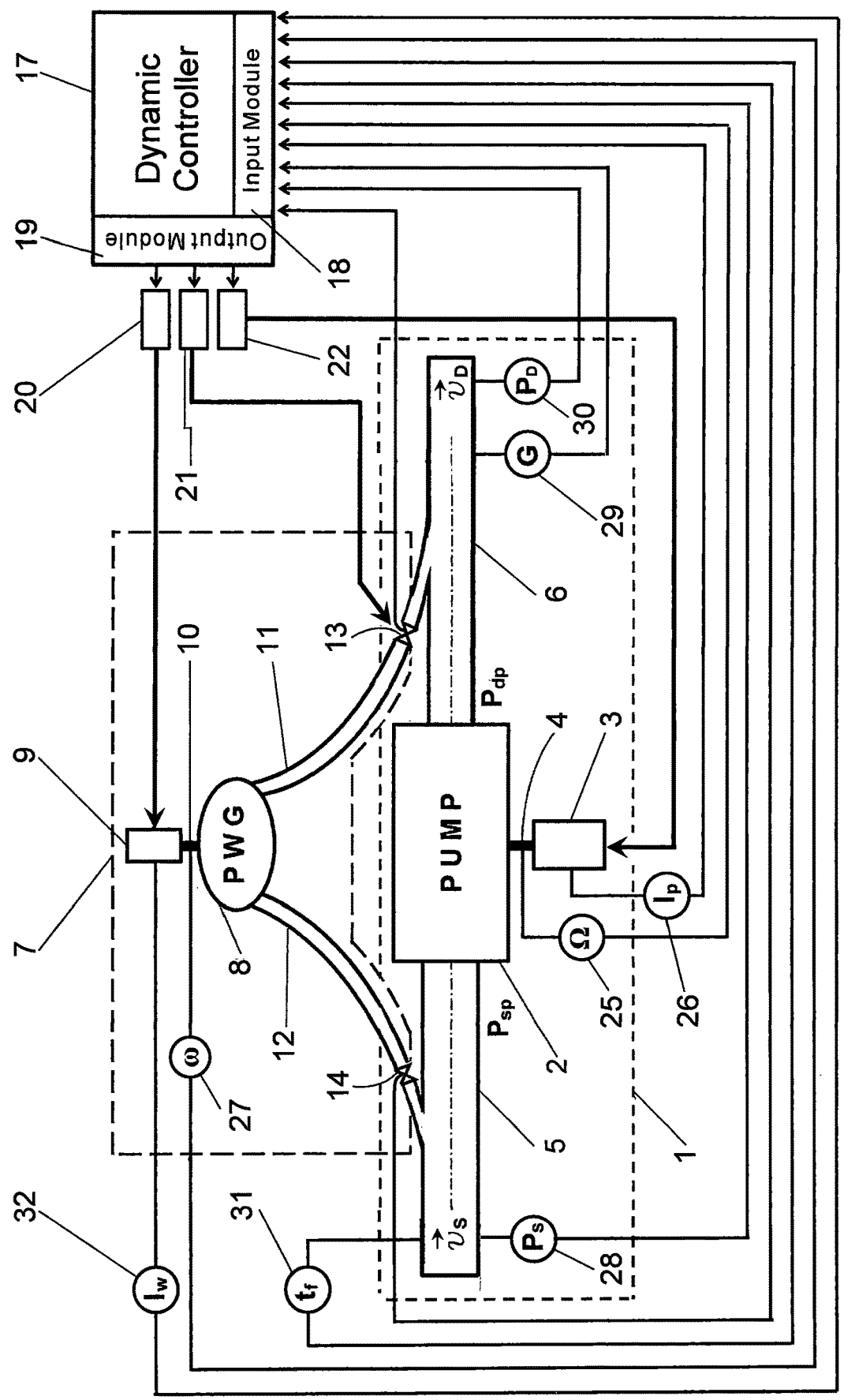
FIG. 5 is a schematic representation of the system of measurement devices, set on the elements of the engineering system, connected to a dynamic controller.

A system of measurement devices comprising measurement devices, installed on the elements of the engineering system, and connected to the dynamic controller, FIG. 5. This system is designed for measuring the current values of:
  the state parameters of fluid medium, a flow velocity, measured by a flow meter, an inlet pressure on a suction pipeline, pressures at the inlet and outlet of the discharge pipeline, a flow temperature;
  parameters of the pump unit components-current of the pump motor, speed of the pump impeller;
  parameters of the wave system-current of the motor of PWG, speed of the shaft of PWG; frequency of the generating pressure waves;
  the pressure waves parameters propagating in the discharge pipeline-amplitude, frequency, waveform.

Each device is configured to measure the current value of parameter and to display on the screen the digital value of measured parameter in the standard or engineering units. For example: pressure can be displayed in Pa, Bar, atm; flow rate can be displayed in GPM, m³/s, m³/h.

Speed of the pump impeller can be measured directly, by tachometer 25, FIG. 5, or calculated by using pump power characteristic and measured current of the pump motor by amperemeter 26.

To ensure high accuracy of the frequency of the generated waves, in the wave system 7 a brushless motor 9 is used. It also smooths out the unevenness of the torque that occurs during operation of the PWG 8. The angular speed of the shaft 10 of the PWG 8 is determined by the torque-speed characteristic of the motor 9, measured by motor current, or by tachometer 27, FIG. 5. The system of measuring devices, the diagram of which is shown in FIG. 5, can be used in a hydrodynamic laboratory loop, for example, to adjust the parameters of generated pressure waves, compare and correct simulated results with experimental ones.

Accuracy of measurement devices is an important requirement. Usually, digital measurement devices in the control system are used and most of them are already operating at any pumping station, except for measurement devices of the wave system. If among the measurement devices there are analog once, then the input module of dynamic controller converts analog signals into digital ones.

During operation of the engineering system of the process of pipeline transporting of fluid medium, each measurement device shows instantaneous value of the current parameter, for example, flow rate G, pressure $P_D$ at the inlet of the discharge pipeline. All measurement devices are set to the same interval of time for updating values of measured parameters. In a particular case, the updated time interval of measured parameter can be changed. For example, for detailed analysis of the change of pressure over time in the wave, during a period, on a pressure sensor display, a shorter updated time interval is set.

Power of the pump motor can be calculated using measured value of the current and standard voltage. This power can also be measured by watt meter. In this case, a watt meter is connected to the motor circuit. Usually, in a pumping stations both of these measurement devices are connected and installed on the control panel.

The current values of the measured parameters change over time, under the influence of weak pressure and flow rate trends that exist in long pipelines, as well as more rough changes in flow rate caused by users. And in the case of the interaction of a turbulent flow with pressure waves, the dynamics and structure of the boundary layer are changed; the spectrum of turbulent fluctuations of the flow velocity and pressure, as well as macroscopic measured parameters, for example, the flow rate G and pressure $P_D$, also are changed. These structural-dynamic changes in the turbulent flow, lead to change in turbulent viscosity and consequently, in the hydrodynamic resistance coefficient, $\lambda_W$ and the energy efficiency, $E_{fW}$. The process of real-time controlling of the structural changes or dynamic state of the turbulent flow is determined by the frequency and amplitude of pressure waves interacting with the flow. Practically, this is carried out automatically by the PWG motor, based on the software data processing the measured current values of the flow parameters: flow velocity v, measured by a flowmeter and calculated by v=G/S; discharge $P_D$ and suction $P_S$ pressures, and hydrodynamic resistance coefficient, $\lambda_W$.

Figure 6:
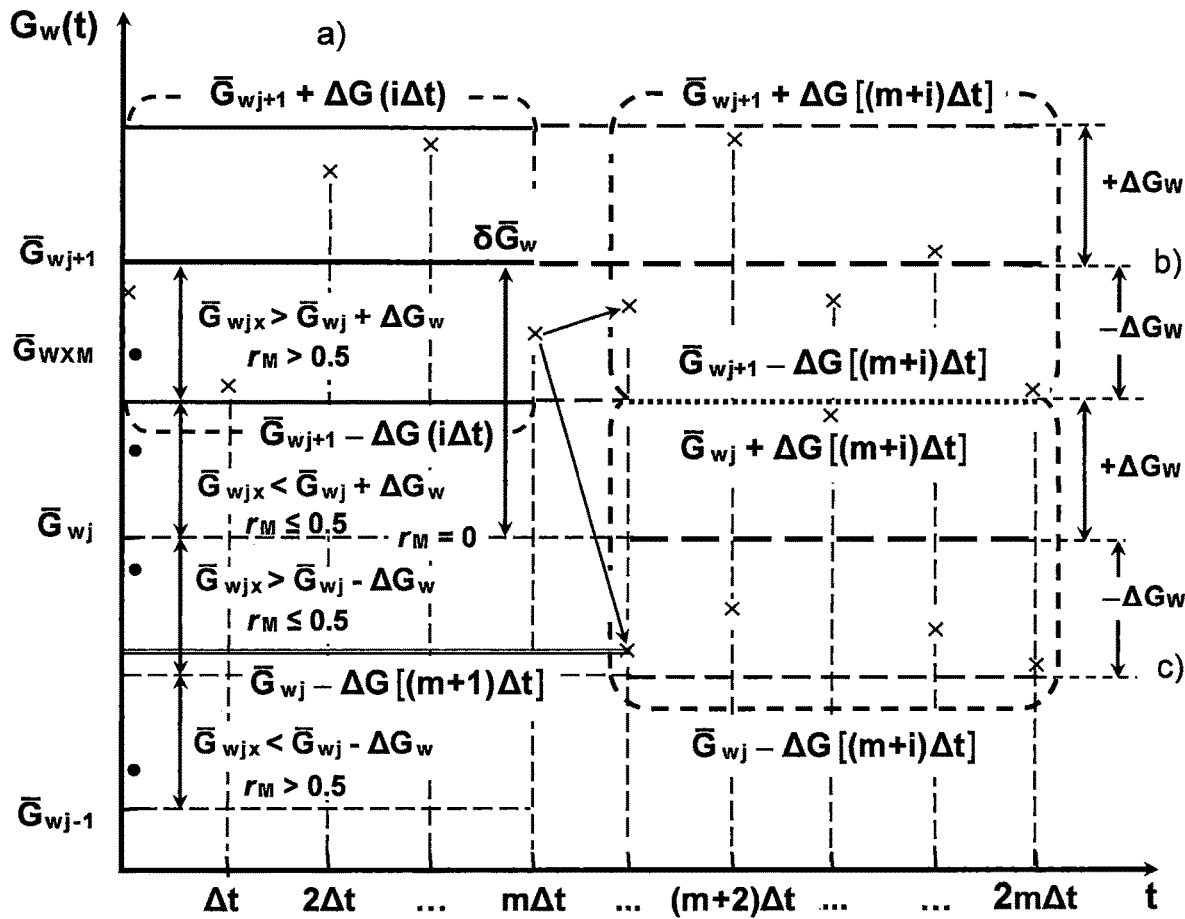
FIG. 6 is a schematic representation of an example of the discrete function obtained as a result of measuring flow rate in the discharge pipeline with the updated time interval $\Delta t$. a), r=0; b), c), r=1.

Usually, the updated time interval, $\Delta t$ of the measured parameter(s), for example, of the flow rate, is quite short (of the order of tens ms) compared with the time interval $\tau_W$ of responses of the output-controlled device and of the wave unit. Therefore, to control the wave unit using dynamic controller 17 with the output-controlled device 20, it is necessary to increase the duration of the time of the supplying current to the motor 9 of the PWG to the order of $\tau_W$. This requirement also relates to averaging time interval of the basic measured independent argument, flow rate. For satisfying the above specified condition, consider the next relation between time intervals: $[m \Delta t] > \tau_W$, where m is an integer. The discrete function $G_{Wj}$ (i $\Delta t$), i=1, 2 . . . m, measured at the points $\Delta t$, 2 $\Delta t$ . . . m $\Delta t$ is converted into a continuous function on the same averaging time interval [m $\Delta t$], as a result of the simple averaging. FIG. 6:

$$<G_j> \equiv \bar{G}_j = (1/m) * \sum_{i=1}^{i=m} G_j(i*\Delta t).$$

The averaging time interval [m$\Delta t$], or number m, is determined from practical considerations. It depends on the flow rate in the discharge pipeline and on the frequency of generated waves. The sign < > and $\bar{x}$ bar means the average value of the indicated parameter, over the given averaging time interval [m$\Delta t$]. Values of the discrete function $G_{Wj}$ (i $\Delta t$) at the points i=1, 2 . . . m, form a scenario. Examples of scenarios: a)-c) in the FIG. 6. Differences in the values of the functions $\Delta G_j[(rm+i)\Delta t] = <G_j> - G_j[(r\ m+i)\Delta t]$—at points (r m+i) $\Delta t$, i=1 . . . m, r=0, 1, 2 . . . N, are the deviations of $G_j$ $[(rm+i)\Delta t]$ from the average value. Thus, the flow rate in any moment of time $t_i$, is defined as:

$$G_1[(rm+i)\Delta t] = <G_j> \pm \Delta G_j[(rm+i)\Delta t]. \quad (7)$$

$t_i \in [(rm+i)\Delta t]$, j=1, 2 . . . n, r=0, 1, 2 . . . N is the sequence of numbers of the averaging time intervals [m$\Delta t$]. A starting of time count is performed from some reference point of counting. For example: i=1, 2 . . . m.
r=0: t=1$\Delta t$, 2$\Delta t$ . . . m $\Delta t$; $\Delta G_j(1\Delta t)$, $\Delta G_j (2*\Delta t)$ . . . $\Delta G$ i (m $\Delta t$).
r=1:t=(m+1)$\Delta t$, (m+2)$\Delta t$ . . . (m+m)$\Delta t$;
$\Delta G_j$ [(m+1)$\Delta t$], $\Delta G_j[(m+2)\Delta t]$ . . . $\Delta G_j[(m+m)\Delta t]$.
r=2: t=(2m+1)$\Delta t$, (2m+2)$\Delta t$ . . . (2m+m)$\Delta t$;
$\Delta G_{(j-1)}[(2m+1)\Delta t]$, $\Delta G_{(j-1)}$ [(2m+2)$\Delta t$] . . . $\Delta G_{(j-1)}[(2m+m)\Delta t] \cdot m < N$.

FIG. 6 is an example of the graphical interpretation of the definition (7): a) r=0; b), c) r=1 from the start of counting time. Obviously, scenarios b) and c) cannot be performed simultaneously. After the scenario a) is performed, either scenario b) or c), one of them can be performed.
+$\Delta G(t)$ is defined in the points t i, in which, $G(t) > (<G_j>)$ in the averaging time interval [m$\Delta t$], r=0, 1. Points above the lines $<G_j>$ and $<G_{j+1}>$ on the FIG. 6.
-$\Delta G(t)$ is defined in the points t in which $G(t_i) \leq (<G_j>)$ on the averaging time interval [m$\Delta t$], r=0, 1. Points below the lines $<G_j>$ and $<G_{j+1}>$ on the FIG. 6.

To assist with the understanding of the discussion of the present invention, the following definitions are provided:
a controlled system, is the turbulent flow in a discharge pipeline, described by the state parameters: "flow velocity", temperature, turbulence structure.
a control function, is a pressure wave of the given amplitude and frequency, generated by PWG, and propagated through the turbulent flow in a discharge pipeline.

The need to use the "flow velocity" in the process of automatic control of energy efficient mode is obviously. A pressure wave interacts with a turbulent flow in the discharge pipeline, which is uniquely described by the flow velocity, not by the flow rate. It is the flow velocity that determines structure and dynamic state of the boundary layer and intensity of turbulent pulsations, which interact with the pressure waves and lead to decrease in the normal components of pulsations, change the specter of turbulent pulsations, anizotropization of turbulence, i.e., to partial laminarization. Ultimately, all these phenomena lead to decrease of hydrodynamic resistance.

However, the main parameter of any pipeline transportation system is the flow rate. This is a basic technological parameter and easily measured with high accuracy. Therefore, in the proposed invention, all measured parameters depend on the flow rate, explicitly or implicitly. However, the physical parameters that underlie the interaction of pressure waves with turbulent flow leading to a change in the state of the controlled system should be considered the flow velocity, both in the description of the patent and in the claims.

The structure of the turbulent flow, and hence, the hydrodynamic resistance coefficient changes when pressure waves interact with the turbulent flow in the pipeline. The frequency of pressure waves controls the internal structure of the turbulent flow. At a certain frequency, the hydrodynamic resistance coefficient, corresponding to current value of the flow rate, reaches a minimum. This frequency is called optimal and corresponds to the energy efficient mode of the pipeline transporting process of flow medium.

Figure 7:
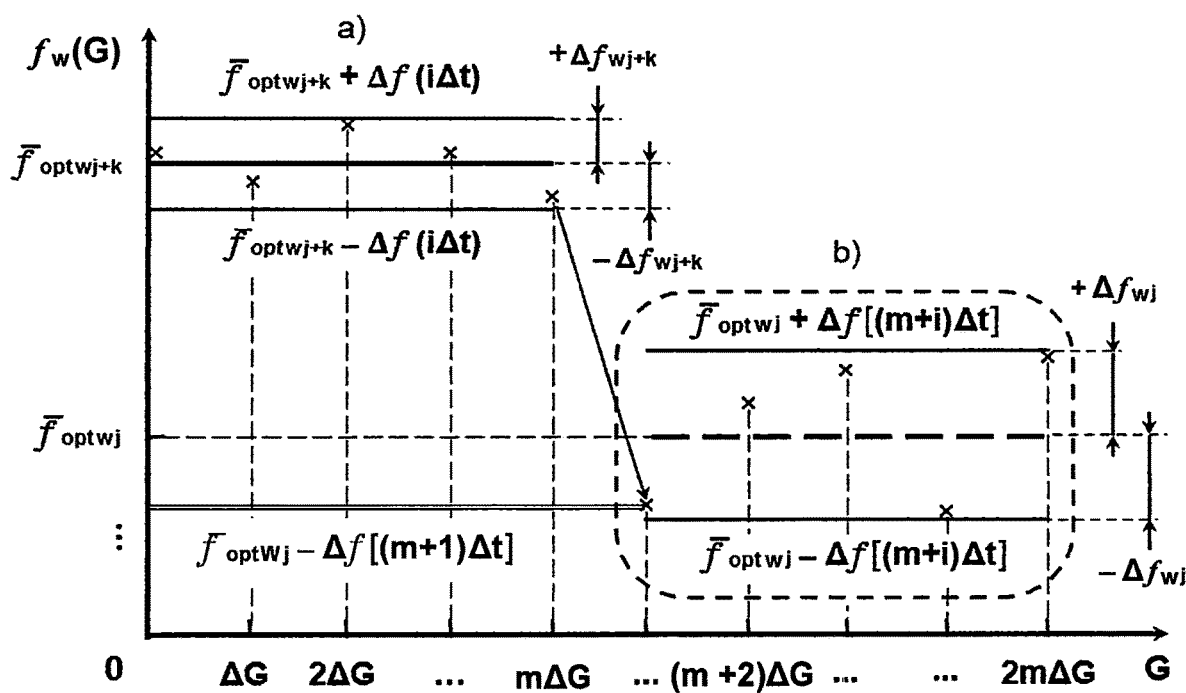
FIG. 7 is a schematic representation of an example of the discrete function obtained as a result of measuring frequencies of pressure waves corresponding to current values of the flow rate in the discharge pipeline, with the updated time interval $\Delta t$. a), r=0; b), c), r=1.

Presentation of the measured flow rate in the form (7), is the first step towards the implementing the process of automatic controlling of the energy efficient mode of pipeline transporting process of flow medium. Measuring the flow rate in real time, means the measuring of the state parameters of turbulent flow. State parameters define the structure of turbulent flow and boundary layer, which determine the value of the hydrodynamic resistance coefficient, $\lambda_W$. The remaining measured and computed energy and dynamic parameters of the turbulent flow, presented in TABLE 2, are considered as functions of the flow rate. FIG. 7 shows an example of such a functional relationship: the frequency of generated pressure waves, as a function of the flow rate. This discrete function is obtained as a result of measuring frequencies of pressure waves, corresponding to current values of the flow rate in the discharge pipeline, with the updated time interval Δt, a), r=0; b), c), r=1.

Power of the PWG motor can be calculated using measured value of the current and voltage, usually low constant voltage. This power can also be measured by wattmeter. In this case in the circuit the of the PWG motor a watt meter is connected.

Below, we will consider only such average functions of the averaging time interval [m Δt], which are obtained as a result of measuring instantaneous values of parameters: flow rate, waves frequency, speed of the pump impeller etc. The value of ratio [m Δt]/$\tau_W$ acquires an important role in the process of automatic controlling of the energy efficient mode.

The measured current values of parameters are transmitted to the input module of dynamic controller.

Figure 8:
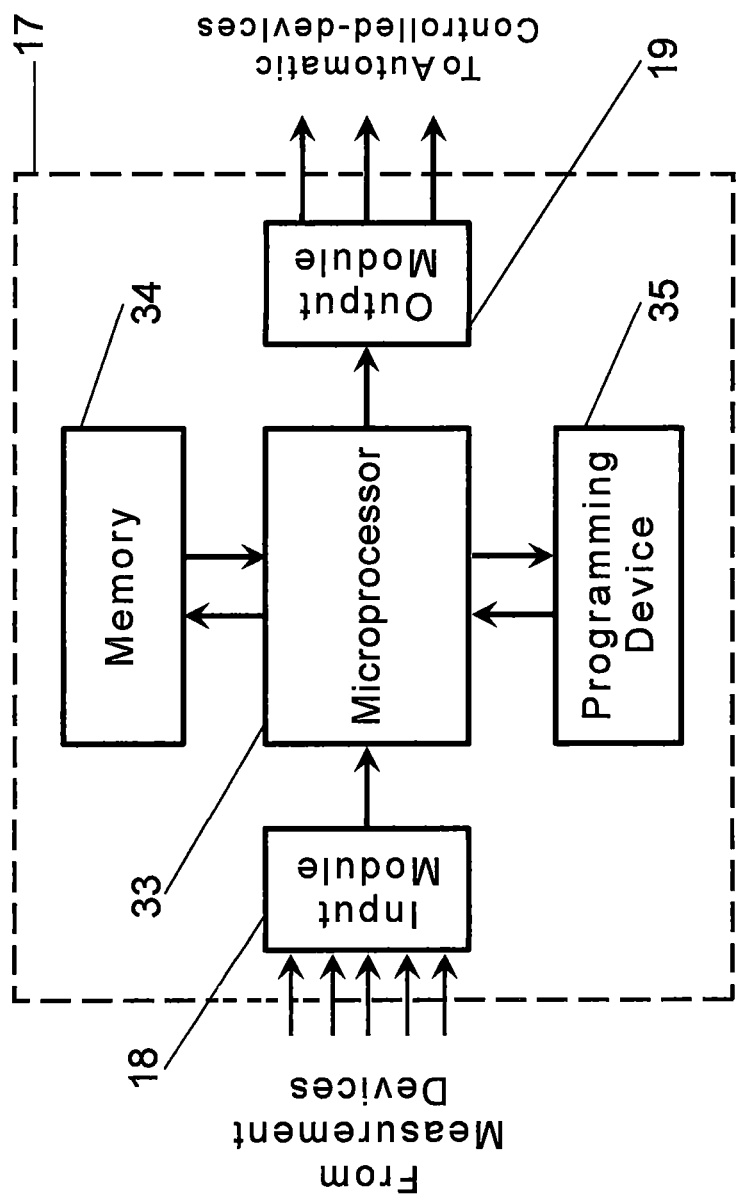
FIG. 8 is a simplified block diagram of the dynamic controller.

A dynamic controller 17, FIGS. 2, 5 is a system, FIG. 8, comprising a microprocessor 33, a memory 34, a programming device 35, that can be a computer, an input module 18, an output module 19, and output-controlled devices 20-22. The dynamic controller is an interconnected system. It is connected to the system of measurement devices, FIG. 5 and to the system of generating pressure waves 15, FIG. 1. Also, it can be connected to a computer 23 or other interface device, 24. The dynamic controller 17 is a feedback controller connected to a controlled system to control the current state of turbulent flow in the discharge pipeline 6 by variation of the frequency of generated pressure waves by changing the speed of the PWG motor 9. All of current values of measured parameters are transmitted by measurement devices to the input module 18. The input module converts all measured parameters into digital format and transmitted to the microprocessor 33. The microprocessor processes the received data and, in accordance with the instructions, transmits it to the output module in digital format. The output module 19 converts all received digital signals into analog and transmits them to the output-controlled devices 20-22. Thus, the microprocessor receives data from the measuring devices, processes them in accordance with the program instructions, and performs controlling the state of the turbulent flow in the discharge pipeline using output-controlled devices 20-22.

A simplified block diagram of the dynamic controller is presented in the FIG. 8. The display, power supply and its connections with the microprocessor, memory, input module, and output module are not shown. The dynamic controller 17 is designed to provide the real-time automatic controlling of the state parameters of the fluid medium transporting in the discharge pipeline in the energy efficient mode. Such mode is maintained by continuous controlling of the speed of PWG motor which determines the frequency of generated waves, interacting with fluid medium in a discharge pipeline. The microprocessor 33 receives from the input module 18 current values of measured parameters in digital format, processes them, and performs in real-time the energy optimization, by minimizing the value of the hydrodynamic resistance coefficient for the current value of the flow rate, by adjusting frequency of generated pressure waves. The mentioned optimization is carried out using a controlled output device 20 of dynamic controller, by controlling the speed, ω of the PWG motor 9.

The dynamic controller 17 can be used for the pump control, for example, with the constant pump RPM using a controlled-device 22, without operating the wave system.

The dynamic controller is configured also for manual operating mode. This means that the user can manually change or fix the current of the pump motor, current of the motor of the PWG, controlling the frequency of generated waves, and valve opening angle of the control valves.

Before proceeding to the description of the method of energy efficient mode of pipeline transporting process of fluid medium, let us consider the database that is the basis for development of the program to implement the method of automatic controlling of this mode.

Figure 10:
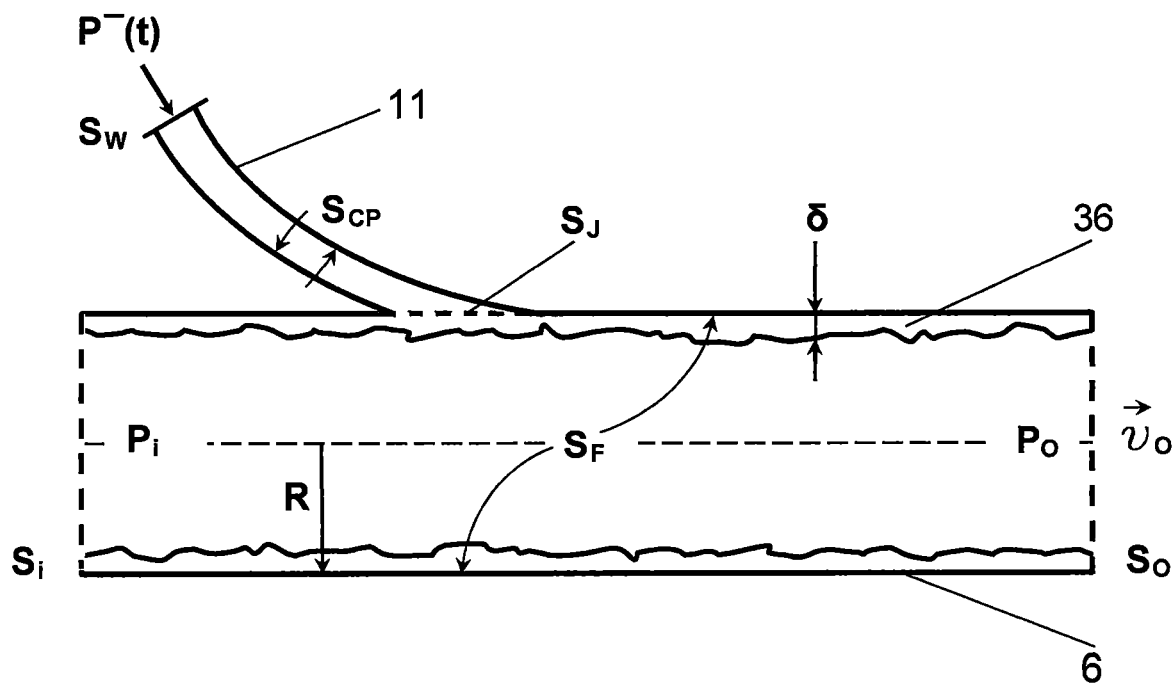
FIG. 10 is a schematic representation of flow domain, consisting of the volume of a portion of the discharge pipe 6, and conjugated with a volume of the portion of connection pipe 11.

The essence of this database is to simulate the turbulent motion of a fluid medium using the Navier-Stokes equation, under the action of the constant pressure and of the perturbed pressure by pressure waves, in the flow domain belonging to a straight horizontal pipeline section with a given constant cross section, FIG. 10. The purpose of the simulation is to compute the optimal frequencies of pressure waves that provide the minimum value of the hydrodynamic resistance coefficient of a turbulent flow at the current value of velocity. Modeling is carried out for a set of discrete values of flow velocities belonging to the entire practical range, $\{v_j\}$, j=1, 2 . . . n. $v_j$=$G_j$/S. As a result, we obtain two sets of solutions, for the constant pressure, $P_D$=const:
profile of the flow velocity, $v_j(r)$, 0≤r≤R, R is the pipe radius;
pressure $P_i$ on the inlet cross-section $S_i$ of the flow domain;
pressure $P_O$ on the outlet cross-section $S_O$ of the flow domain;
average value of the kinetic energy of turbulent motion;
radial and longitudinal distributions of the turbulent kinetic energy;
the wall shear stress;
hydrodynamic resistance coefficient, $\Delta_j$; and
pressure losses on the flow domain;
for a perturbed pressure by pressure waves P⁻(t), FIG. 3:
profile of the average flow velocity, $\bar{v}_{Wj}(r)$, 0≤r≤R;
average value of the pressure $\bar{P}_{Wi}$ on the inlet cross-section $S_i$ of the flow domain;
average value of the pressure $\bar{P}_{Wo}$ on the outlet cross-section $S_O$ of the flow domain;
average value of the wave's frequency providing minimum value of the hydrodynamic resistance coefficient, $\mathcal{F}_{optj}(\bar{v}_{Wj})$;
average value of the kinetic energy of turbulent motion;
radial and longitudinal distributions of the turbulent kinetic energy;
average value of the wall shear stress;
average value of the hydrodynamic resistance coefficient, $\lambda_{Wj}(\mathcal{F}_{optj}(\bar{v}_{Wj}))$;
average value of the pressure losses on the flow domain.

These two sets constitute the database for the baseline file which is used for the comparative analysis of the states of controlled system when the control function is changing.

Next, the energy efficiency $E_f$ and $\bar{E}_{fW}$ are calculated and compared. Modeling is carried out using a sufficiently accurate computational tool, for example, Large Eddy Simulation (LES), which is widely used in Computational Fluid Dynamics (CFD). Calculations are carried out over the entire practical range of the flow velocity and consequently, of the Reynolds numbers.

Obtaining the Baseline Data for the Turbulent Flow Under the Action of the Constant Discharge Pressure.

The flow domain of horizontal cylindrical form, FIG. 10 is limited by inner cylindrical surface $S_F$, inlet surface $S_i$ and outlet surface $S_O$, both perpendicular to longitudinal axis of symmetry. The turbulent motion of the fluid medium is simulated under the action of the constant pressure over the entire practical range of the flow velocity, $\{v_j\}$, j=1, 2 ... n; the corresponding values of the hydrodynamic resistance coefficient, $\lambda_j$, are computed. The discrete set of the values $\{v_1, v_2 ... v_n\}$ uniformly covers the entire practical range of the flow velocity, that is $v_{j+1}-v_j=\delta v=$const, j=1, 2 ... n. In the simulation process the flow velocity is used. Flow rate is directly related to the cross-sectional area of the flow domain (pipe) and can be measured easily and accurately. The discrete set of the values of the computed flow velocities $\{v_1, v_2 ... v_n\}$ is equivalent to the discrete set of the values of the measured flow rates $\{G_1, G_2 ... G_n\}$. And $G_j=v_j*S$, $G_{j+1}-G_j=\delta$ G=const1. If LES is performed on another computer, then the results are uploaded in the programming device 35. The simulation results are verified experimentally.

Experimental verification of the hydrodynamic resistance coefficient, $\lambda$ obtained as a result of the LES, is carried out as follows: a horizontal experimental section of the pipeline with a length L and a diameter D is selected, at the distance of more than 35 pipe diameters downstream from the conjugation surface $S_D$, FIG. 10. Pressure sensors are installed at the ends of the experimental section of pipeline. The pump is turned on, the flow rate is fixed, the pressures at the ends of experimental section of the pipeline are measured, and the pressure losses $\Delta P_\lambda$ are computed. The flow rate $G_j$ is adjusted discretely with a constant step, $\delta$ $G_j$; j=1, 2 ... n. Similarly, the pressure losses $\Delta P_{\lambda j}$ are computed. The experimental results of the pressure losses are compared with theoretical results, according to the Dacy-Weisbach equation. Theoretical and experimental results are corrected.

In the process of experimentation, the error of all measuring devices is determined. The final corrected results are presented in TABLE 1.

TABLE 1

Baseline data. $P_D$ = const.

| j | $G_j$ | $v_j$ | $Re_j$ | $Ps_j$ | $P_{Dj}$ | $I_j$ | $\Omega_j$ | $N_{Pj}$ | $\lambda_j$ | $V_j$ | $E_{fj}$ |
|---|---|---|---|---|---|---|---|---|---|---|---|
| 1 | $G_1$ | $v_1$ | $Re_1$ | $Ps_1$ | $P_{D1}$ | $I_1$ | $\Omega_1$ | $N_1$ | $\lambda_1$ | $V_1$ | $E_{f1}$ |
| 2 | $G_2$ | $v_2$ | $Re_2$ | $Ps_2$ | $P_{D2}$ | $I_2$ | $\Omega_2$ | $N_2$ | $\lambda_2$ | $V_2$ | $E_{f2}$ |
| . | . | . | . | . | . | . | . | . | . | . | . |
| q | $G_q$ | $v_q$ | $Re_q$ | $Ps_q$ | $P_{Dq}$ | $I_q$ | $\Omega_q$ | $N_q$ | $\lambda_q$ | $V_q$ | $E_{fq}$ |
| . | . | . | . | . | . | . | . | . | . | . | . |
| n | $G_n$ | $v_n$ | $Re_n$ | $Ps_n$ | $P_{Dn}$ | $I_n$ | $\Omega_n$ | $N_n$ | $\lambda_n$ | $V_n$ | $E_{fn}$ |

These results constitute the baseline data (reference data) for the turbulent motion of the fluid medium in a pipeline, under the action of stationary pressure, $P_D$=const. In essence, the baseline data at constant pressure is the table function in which, the measured independent argument is the flow rate, $G_j$, j=1, 2 ... n. This is the basic measurable technological parameter. The remaining parameters presented in the columns of the TABLE 1 are functions, dependent on the flow rate. Moreover, some of them are measured, and some are computed using values of measured parameters. For example, the flow velocity, $v_j=G_j/S$, S is the cross-sectional area of the flow domain (pipe); $S=S_I=S_O$, FIG. 10; Reynolds number, $Re_j=A*G_j$, $A=4/(\pi^D\gamma)$; D=2R is the pipe diameter; $V_j$ is the volume of the pumped fluid, during the given time interval, for example, $\Delta\tau_G$; $Ef_j$ is the energy efficiency. Subscript q is integer, q=n/2.

This is the baseline file, considering the action of constant pressure on the turbulent flow in the discharge pipeline. It is developed by programming device 35, is uploaded and is stored in the memory 34 of the dynamic controller 17.

It is obvious, that the main measurable flow parameter, flow rate $G_j$ (TABLE 1), is easily generalized to other similar flows, using the Reynolds similarity criterion, $Re_j=4 G/\pi D\gamma=v_j D/\gamma$. For example, if the kinematic viscosity of the main flow and of a similar flow are equal, then from the condition of similarity of flows it follows: $v_j/D_j=v_\infty/D_\infty$. This condition can be generalized to flows with other pipe diameters and the entire practical range of the flow velocity. Subscript $\infty$ relates to parameters of the similar flow. Pressures $P_S$ and $P_D$, as well as parameters of the pump, Q j and the pump motor, $I_j$, $N_{Pj}$, clearly depend on the flow rate, diameter and length of the pipeline, and also on its configuration, bends and elevation. Parameters Psi, $P_{Dj}$, $I_j$, $\Omega_j$, $N_{Pj}$, $G_j$, are intrinsic parameters of the pumping system. They serve to determine the energy and power parameters of the pumping system, for example, calculating the energy efficiency $E_f$, of the pipeline transporting process of flow medium, using (1). They also serve to monitor the operating dynamics and stability of the pumping system. Therefore, intrinsic parameters of the pumping system are added as data points to the baseline file, TABLE 1.

Figure 9:
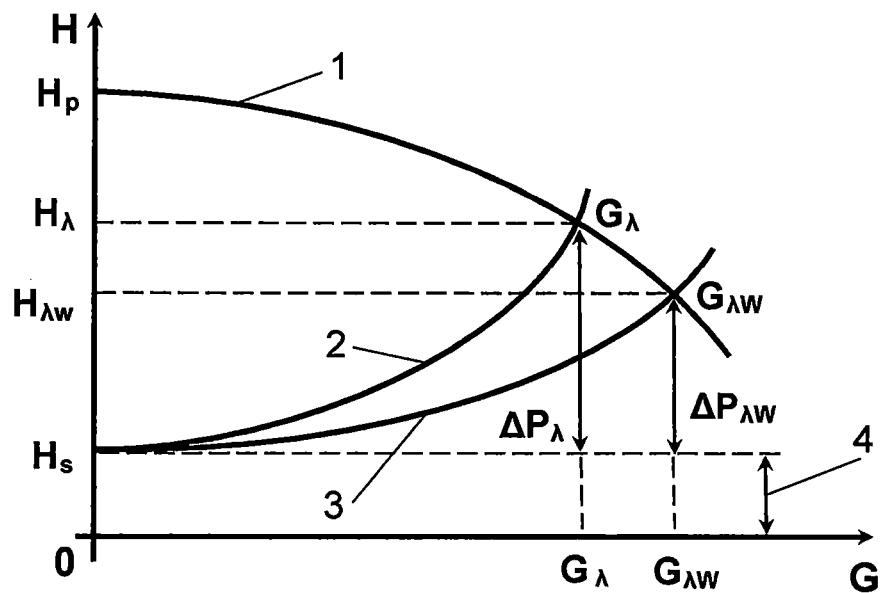
FIG. 9 is an example of graphical presentation of the head-flow curves of the pump and of the piping system.

The increase of energy efficiency of perturbed turbulent flow by pressure waves is carried out not only explicitly, due to the decrease of hydrodynamic resistance, but also implicitly, due to the change in flow rate. FIG. 9 shows an example of the graphical presentation of the head-flow curve of the pump, curve 1, and of the system, curve 2 relating to unperturbed flow with the volumetric flow rate G. When the PWG is turned on, the interaction of pressure waves with turbulent flow leads to decrease of hydrodynamic resistance of the system. Due to internal changes in turbulent flow, under the influence of pressure disturbances, the system head-flow curve increases curvature and takes the position 3; 4 is the static head, $H_S$. Pressure losses $\Delta P_{\lambda W}$ are decreased: $\Delta P_{\lambda W}<\Delta P_\lambda$. This decrease is accompanied by increase in the flow rate, from $G_\lambda$ to $G_{\lambda W}$. Thus, the full contribution to the increase of energy efficiency is also determined by the increase in flow rate, $\Delta G_{\lambda W}=G_{\lambda W}-G_\lambda$.

Obtaining the Baseline Data for the Turbulent Flow Under the Action of Perturbed Discharge Pressure by Pressure Waves.

Figure 3:
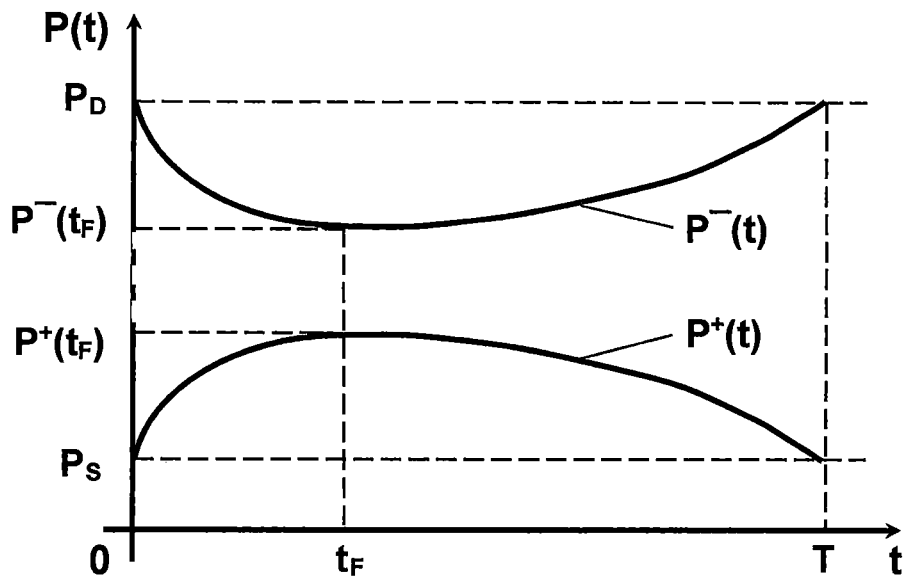
FIG. 3 is an example of schematic representation of the asymmetric compression pressure wave $P^+(t)$ and the rarefaction pressure wave $P^-(t)$, forming simultaneously in the pressure waves generator.

The purpose of this baseline data is to compute the optimal values of frequencies, $<f_{opt}, j>_{opt}$ and amplitudes, $\overline{P}^-(t_F)$ opt of pressure waves, interacting with the turbulent medium flow, and to provide the minimum values of the hydrodynamic resistance coefficient, $\lambda_W$ compared with the hydrodynamic resistance coefficient, A of the same discharge pipeline, of the same current values of the flow velocity, but under the action of the constant pressure. To achieve this purpose, the turbulent motion of the medium flow in the discharge pipeline, interacting with pressure wave, $P^-(t)$, FIG. 3, is simulated, by using LES. During the simulation, the wave frequency and amplitudes vary. Calculations are carried out over the entire practical range of the flow velocity and consequently Reynolds numbers.

The configuration of flow domain is selected in such a way, that the physical picture of the simulated interaction of pressure waves with the turbulent flow in the pipeline is as close as possible to the real case scenario.

Flow domain, FIG. 10, consists of the volumes of portions of the discharge pipe 6 and of the connection pipe 11, connected through a conjugated surface, $S_J$. Surfaces bounding the flow domain are: an inlet $S_I$ and an outlet $S_O$, the inner surface of the discharge pipe $S_F$, a conjugated surface $S_J$, an inner surface of connecting pipe, $S_{CP}$, and a surface of cross-sectional area of connecting pipe, $S_W$. Pipe volumes communicate only through the conjugated surface $S_J$. Therefore, the boundary conditions on the surface $S_W$ essentially set the boundary conditions on the surface $S_J$, through which the wave energy is transmitted to the turbulent flow in the discharge pipeline. And besides: $S_J = S_O$, $S_W/S_D < 0.04$.

To identify the effects of decreasing, and further minimizing the hydrodynamic resistance of the flow domain, operating boundary conditions are used. On the surfaces bounding the flow domain the following boundary conditions are inserted: on the $S_I$, a mass flow rate; on the $S_O$, pressure; on the surfaces $S_F$ and $S_{CP}$, the no-slip conditions of the flow velocity; on the surface SW, the pressure wave action, $P_S^-(t)$. Pressure $P_S^-(t)$ is changed by the wave law relatively to the discharge pressure $P_D$, FIG. 3. During the LES simulating process, the boundary conditions on the surface S w are set, by User Defined Function. This function completely defines the rarefaction wave $P_S^-(t)$ on the surface $S_W$: the form, amplitude, and frequency. Boundary conditions on the surface $S_W$ essentially set the boundary conditions on the surface $S_J$, through which the wave energy is transmitted to the turbulent flow in the discharge pipeline.

The essence of the LES simulation is to compute the optimal frequency, $f_{opt\,j} = \langle f_{optj} \rangle \pm \Delta f_j$ corresponding to current value of the flow velocity $v_{Wj}$ [(rm+i)Δt]=<$v_{Wj}$>±Δ$v_{Wj}$ [(rm+i)Δt]) or flow rate, $G_{Wj}$[(rm+i)Δt]=<$G_{Wj}$>T Δ$G_{Wj}$ [(rm+i)Δt], which provides the minimum value of the hydrodynamic resistance coefficient, $\bar{\lambda}_W = \bar{\lambda}_{Wmin}$, i.e. $\bar{\lambda}_{Wj}/\bar{\lambda}_j$=min, and $\bar{\lambda}_{Wj} = \bar{\lambda}_{wj}^{min}$, j=1, 2 . . . n. In this case the following inequality is satisfied:

$$[\lambda_j - (\bar{\lambda}_{wj}^{min})] < \Delta_\lambda. \qquad (8)$$

where $\Delta_\lambda$ is the minimum value of the difference in the hydrodynamic resistance coefficients, valid for any value of the flow rate, $\bar{G}_{Wj}:\bar{G}_{Wj}=G_j$.

Note, that inequality (8) is satisfied in a certain range of the flow rate changes. In practice, this means that there is a certain range of waves frequencies changes corresponding to a certain range of flow rate changes in which inequality (8) is satisfied. Under the action of pressure waves, the stabilized state of turbulent flow is provided. This is a fundamental principle in the process of automatic controlling of dynamic systems, that the turbulent flow is interacting with pressure waves.

It is this correspondence between the frequency $\bar{f}_{opt\,j}$ and the flow velocity, $\bar{v}^{wj}$, that plays a central role in the process of automatic controlling of the energy efficient mode of pipeline transporting process of fluid medium. This process is carried out in real-time by the dynamic controller 17 with the use of its feedback between the state parameters of the turbulent flow in the discharge pipeline, $\bar{v}_{wj}$ and the frequency of generated pressure waves, $\bar{f}_{optj}$. Therefore, the table function $\bar{f}_{optj}(\bar{v}_{Wj})$ (TABLE 2), is obtained as a result of the LES simulation. Then it is corrected experimentally. The final data $\bar{v}_{Wj}$, $\bar{f}_{optj}(v_{Wj})$, $\bar{\lambda}_{min\,Wj}$ form the functional dependences, $\bar{f}_{optj}(\bar{v}_{Wj})$ and $\lambda_{min\,Wj}(\bar{f}_{optj}(\bar{v}_{Wj}))$ which is the baseline file, considering the action of pressure waves on the turbulent flow.

If LES is performed on another computer, then the results are uploaded into the programming device 35.

The simulation results are verified and corrected on the laboratory hydrodynamic loop. Boundary conditions used on the surfaces $S_I$ and $S_W$ of the flow domain during the process of LES simulation are practically realized as follows:

1. the fluid flow and pressure applied to the $S_i$ surface is provided by a pump;
2. the frequency of the generated pressure waves, set on the surface $S_W$, FIG. 10, is provided by the rotation speed of the pressure waves generator, which is controlled by the current in the motor 9, FIG. 1;
3. the amplitude and form of generated pressure waves, set on the surface $S_W$, are determined by the shapes and sizes of the profiles of the surfaces of the openings in the walls of coaxially located cylindrical elements, providing connection between zones with different pressures $P_{sp}$ and $P_{dp}$ of the flow medium, during operation of the PWG (details U.S. patent Ser. No. 10/233,952).

If the amplitude of the generated pressure waves obtained as a result of the LES is not enough to provide the minimum values of hydrodynamic resistance $\bar{\lambda}_{wj}^{min}$ and of energy efficiency, $\bar{E}_{fW}$ on the laboratory hydrodynamic loop, then it is corrected by non-essential variation of the valve opening angle Ψ of the controlled valve, for example 13, relatively to the default value $\Psi_D$.

Experimentally, the hydrodynamic resistance coefficients $\lambda_j$ and $\bar{\lambda}_{wj}^{min}$ are not measured directly, but implicitly, by measuring pressures at the ends of the experimental section of the pipeline, pump power or current in the pump motor. Energy efficiency $E_f$ and $\bar{E}_{fW}$ are calculated using measured parameters: flow rate, power or current in the pump motor, over a given averaging time interval.

Inequality (8) imposes the following condition on energy efficiency:

$$[E_{fj} - (\bar{E}_{fwj}^{min})] < \Delta_E, \qquad (9)$$

where $\Delta_E$ is the lower acceptable limit of energy efficiency.

Inequality (9) is based on experimental measured parameters and is used for laboratory testing of simulated results. It is also used by the program for providing the proposed method of automatic controlling of the energy efficient mode in an industrial environment, by the use of current measured parameters of the system for generating pressure waves. ΔE is set practically. Its estimated value is based on the configuration of the pipeline, physical properties of the flow medium, and of the flow rate.

The sketch of laboratory hydrodynamic loop is similar to one represented on the FIG. 5, with non-essential changes. Instead of the dynamic controller 17 the simplified manual control panel is used. In addition, the suction pipeline is equipped with a valve for manual flow control; the experimental section is a part of the discharge pipeline, equipped with pressure sensors at the beginning and at the end; connecting pipes 11, 12 of the PWG, equipped with pressure meters, for detailed analysis of the law of change of pressure over time in the generated waves. During experimental testing of simulation results, the flow rate, current of the pump motor, and current of the motor of PWG, defining the frequency of generated waves, are varied manually. By default the waves amplitude, is set by the connecting surface $S_C(t)$, and can be non-essential corrected manually, by discrete varying of the valve opening angle Φ of the control valve, for example, 13. For a more detailed analysis of the law of pressure change in the wave, a shorter updated time interval can be set on the pressure sensors. The optimal value of frequency $\bar{f}_{opt\,Wj}$ at a fixed flow rate $\bar{G}_{Wj}$ ensures the minimum value of the hydrodynamic resistance coefficient, $\bar{\lambda}_{minWj}$, which is calculated according to the measured values of pressure at the ends of the experimental section of pipeline. Experiments are carried out for entire practical range of values of the flow velocities, $\{\bar{v}_{Wj}\}$, j=1, 2 ... n. $\bar{v}_{Wj}=\bar{G}_{Wj}/S$, same as for the baseline data for the constant pressure: $\bar{G}_{Wj}=G_j$, j=1, 2 ... n. $\bar{G}_{Wj+1}-\bar{G}_{Wj}=\delta\bar{G}_W=\delta G=const1$, FIG. 6. Entire practical range means that the flow velocity in a pipeline of a given diameter practically varies from the minimum to the maximum possible values. For a more accurate calculation of the optimal waves frequency, $\mathcal{F}_{opt\,W}$ and further experimental correction, it is required, that the intervals of the flow rate $\delta\bar{G}_W$ be relatively small, FIG. 6. The same requirement relates to the intervals of the flow velocity. In addition, the maximum and minimum deviations of two consecutive values of the flow rate must match, i.e.

$$\bar{G}_{Wj+1}-\Delta G_{Wj+1}=\bar{G}_{Wj}+\Delta G_{Wj},$$

$$\Delta G_{Wj+1}=\Delta G_{Wj}=\Delta G_W=const1, j=1, 2 \ldots n. \quad (10)$$

Equality (10) is a fundamental condition in terms of the program for implementation of the method of automatic controlling of energy efficient mode of pipeline transporting process of the flow medium. The condition of "cross-linking" (10) at the ends of any two successive intervals $\Delta G_{Wj}$ and $\Delta G_{W+1}$ is required. An example of this condition, for scenarios a) and c), $\bar{G}_{Wj}+\Delta G_W=\bar{G}_{Wj+1}-\Delta G_W$ is presented geometrically on the FIG. 6, the dotted line. Cross accent, x is the measured instantaneous values of the flow rate, $\Delta G(i\Delta t)$. Example: c), double line, $\bar{G}_{Wj}-\Delta G[(m+1)\Delta t]$, i=1.

If the flow rate in the pipeline changes significantly, for example, for technological needs, then the average values of the flow rate change over time until another stationary state is stabilized, FIG. 6, c); k>1. To this continuous range of flow rates corresponds a continuous range of optimal waves frequencies, that provides the minimum value of the hydrodynamic resistance coefficient. However, while the deviations of the flow rate from any average value are the same, $\pm\Delta G_W$, (10), the corresponding deviations of the frequencies from the average value, $\Delta f_{opt\,Wj}$ and $\Delta f_{opt\,Wj+1}$, are different. This is due to nonlinear dependence between the optimal frequencies of pressure waves and flow rate. Any two successive values optimal pressure wave frequencies of this nonlinear dependence (function) are expressed by the condition:

$$\mathcal{F}_{optWj}+\Delta_{fWj}\neq\mathcal{F}_{optWj+1}-\Delta f_{Wj+1}$$

$$\Delta f_{Wj}\neq\Delta f_{Wj+1}, j=1, 2 \ldots n. \quad (11)$$

This means, that for different optimal frequencies, the intervals of deviation from the average value differ. This is schematically represented in FIG. 7. Cross accent, x is the measured instantaneous value of the frequency, $\Delta f(i\Delta t)$. Example: double line, $\mathcal{F}_{optWj}-\Delta f[(m+1)\Delta t]$, i=1.

Thus, the results of the LES are corrected experimentally.

In the process of experimental correction of simulated parameters in laboratory conditions and further in industrial environment, the number of experimental points m is much greater than indicated in FIGS. 6, 7.

Experimental laboratory correcting of computed parameters is carried out as follows: if the diameter of the pipeline is equal to diameter of the simulated flow domain, then, the function $\mathcal{F}_{optWj}(\bar{G}_{Wj})$ is corrected. And $\mathcal{F}_{optWj}(\bar{G}_{Wj})$ is equivalent to $\mathcal{F}_{optWj}(\bar{v}_{Wj})$; wherein $\bar{G}_{Wj}=G_j$. The frequency is varied in the vicinity of the computed optimal value, at which the minimum value of $\bar{\lambda}_{min\,Wj}$ is reached. This is the value of optimal frequency, $\mathcal{F}_{optWj}$. To achieve the optimal value of frequency $\mathcal{F}_{opt\,Wj}$, if necessary, the amplitude of the pressure waves is non-essential corrected by varying the valve opening angle $\Psi$ of the controlled valve, for example 13. Other words, the function $\mathcal{F}_{op\,wj}(\bar{v}_{wj})$ is corrected in the entire practical range of the flow velocity and the nonlinear functional dependence $f_{opt\,Wj}(\bar{v}_{Wj})$ is built.

The deviations of the measured instantaneous values of parameters from the average are due to the dynamic changes of turbulent flow, actual process of generating waves, as well as the accuracy of measuring devices. The deviations of the measured instantaneous values of parameters from the average, for example, of the flow rate, $\Delta G(i\,\Delta t)$, over an averaging time interval [m $\Delta t$], are located in a fairly wide range. A part of deviations belong to the interval, $\Delta G(i\Delta t)\in[\bar{G}_{Wj}-\Delta G_W,\bar{G}_{Wj}+\Delta G_W]$ adjacent to average value $\bar{G}_{Wj}$, FIG. 6. Other parts are located outside the interval $\Delta G_W$, $\Delta G(i\Delta t)\notin[\bar{G}_{Wj}-\Delta G_W,\bar{G}_{Wj}+\Delta G_W]$. They are located within the interval $\Delta G_W$, which is adjoined to the average values of $\bar{G}_{Wj}-1$ or $\bar{G}_{Wj}+1$ and are satisfactorily approximated as:

1. $\bar{G}_{Wj}$, if $\Delta G(i\Delta t)\in[\bar{G}_{Wj}-\Delta G_W,\bar{G}_{Wj}+\Delta G_W]$;

2. $\bar{G}_{Wj-1}$, if $\Delta G(i\Delta t)<\bar{G}_{Wj}-\Delta G_W$;

3. $G_{Wj+1}$, if $\Delta G(i\Delta t)>\bar{G}_{Wj}+\Delta G_W$. (12)

By substituting $\bar{G}_W$ with $\bar{v}_W/S$ in expression (12), we obtain similar expressions for the average values of the flow velocity.

Thus, the experimentally measured average values of $\bar{G}_{WX}$ cover the entire practical range of flow rate, and of the flow velocity. Wherein, any measured value of current flow rate $\bar{G}_{WX}$ is satisfactorily approximated by one of the conditions (12). Similar approximations are also valid for the flow velocity $\bar{v}_{wX}$, control function $\mathcal{F}_{opt}$ and any other measured parameter.

Such a complementary approach, theoretical and experimental, is aimed to defining the corrected control function $\mathcal{F}_{opt}$ and the controlled dynamic system, which is a turbulent flow in the discharge pipeline in the state with the minimum value of the hydrodynamic resistance coefficient, $\bar{\lambda}_{min\,W}$.

All measured and calculated parameters are recorded in the baseline file. Computed and experimental results are corrected. The final corrected results are presented in the TABLE 2; for any j, j=1, 2 ... n: $\bar{G}_{Wj}=G_j$, or $\bar{v}_{Wj}=v_j$.

These results constitute the baseline data for the turbulent motion of the fluid medium in a discharge pipeline, interacting with pressure waves. Part of the baseline data is obtained by recording parameters from measurement devices, the next part has been obtained as a result of computer simulation, and the last part is computed. Each computed parameter is linear related to some measured parameter. For example, the flow velocity, $\bar{v}_W$: $\bar{v}_W=K\,\bar{G}_W$, K=1/S, S is the pipe cross-sectional area, where the flowmeter is installed.

Average measured and computed parameters presented in the TABLE 2 are recorded in the baseline file. Further, all n rows in the baseline file are sorted in ascending order of the average values of the flow rate $\bar{G}_{Wj}$: $\bar{G}_{W1}<\bar{G}_{W2}<\ldots<\bar{G}_{Wn}$. The analogical chain of inequalities is valid for the values of average values of the flow velocity $v_{Wj}$: $v_{w1}<v_{w2}<\ldots<v_{wn}$. Besides, the interval between two consecutive average values of the flow rate, interacting with pressure waves, is the same, and is equal to $\delta\bar{G}_W$:

$\bar{G}_{W2}=\bar{G}_{W1}+\delta\bar{G}_W$; $\bar{G}_{W3}=\bar{G}_{W2}+\delta\bar{G}_W=\bar{G}_{W1+2}\delta\bar{G}_W, \ldots,$ $\bar{G}_{Wp}=\bar{G}_{W1}+p*\delta\bar{G}_W$. p=1, 2 ... n.

If $\bar{G}_{W1=0}$, then, $\bar{G}_{Wp}=p*\delta\bar{G}_W$. p=0, 1, 2 ... n.

The proposed method of automatic control of energy efficient mode uses only average values of measured parameters over an averaging time interval [m$\Delta t$]. Sources and magnitude of deviations of measured values from the average, will not be analyzed and considered.

Considering the action of pressure waves on the turbulent flow, a baseline file is created by using programming device 35, which is uploaded and stored in the memory 34 of the dynamic controller 17. The program, developed for implementation of the method of automatic controlling of the energy efficient mode is installed in the microprocessor 33. The program processes the received data from measurement devices, and can use any parameter of the baseline files for calibrating, correcting, and comparing the measured parameters with the parameters of the baseline files.

The data contained in the baseline files is used during the process of automatic controlling of energy efficient mode.

In TABLE 2, more columns can be added. For example: the column comparing the energy efficiency $E_{fj}$ and $\overline{E}_{fWj}$ during a day, a week, a month; column of the cost of pipeline transportation of a volume of fluid medium, in energy efficient mode and in the normal mode during a day, a week, a month; column ($E_{fj}$-$E_{fj}$) provides an estimated quantity of saved energy.

Experimental studies carried out on a laboratory hydrodynamic loop show that the power component $N_e$ in balance equation (4) is about ~0.1% of the pump power and changes slightly with changes in flow rate in the discharge pipeline.

The data from TABLE 2 is obtained as a result of simulation of the turbulent motion of flow medium in the flow domain of the given sizes and configuration; the optimal frequencies are computed, for which the hydrodynamic resistance coefficient reaches the minimum value for any value of the flow rate belonging to entire practical range.

The main measured parameter is the flow rate, $\overline{G}_{Wj}$, that is equivalent to calculated flow velocity $\overline{v}_{Wj}=\overline{G}_{Wj}/S$ and can be generalized to other similar flows using the hydrodynamic similarity criteria. The control function, $\mathcal{J}_{opt\,j}$, is inextricably linked to the level of turbulence of the flow, and is determined by the flow velocity. Current in the PWG motor, $T_{Wj}$, its speed, $\overline{\omega}_j$, power, $N_{PWj}$, and the valve opening angle $\Psi_s$, are the intrinsic parameters of the wave system. The intrinsic parameters of the pumping system are: current, $T_{PWj}$, speed, $\overline{\Omega}_{Wj}$, and power, $N_{Wj}$ of the pump motor, pressures, $\overline{P}_{SWj}$ and $\overline{P}_{DWj}$, amplitude of pressure waves, $\overline{P}_j$, and energy efficiency $\overline{E}_{fWj}$. All of them depend on the flow rate, diameter, length, and configuration of the pipeline. The intrinsic parameters of the wave system, which determine the control function, reflect the dynamic state of the controlled system, determined by the flow velocity. The intrinsic parameters of the pumping and wave systems are used by the program for continuously providing the energy efficient mode of the process of pipeline transporting of fluid medium and to monitor the stability of the operation of the wave and pumping systems. Therefore, intrinsic parameters of the pumping and wave systems are added as data points to the baseline file considering the turbulent motion of the flow medium under the action of pressure waves.

Simulating the turbulent motion of the flow medium under the action of pressure waves in the flow domain with specific configuration, sizes, and the experimental testing and specifying the obtained results, represent the methodological steps of practical realization of the proposed method. The dimensions of the flow domain are arbitrary. They do not impose any restrictions on the proposed invention.

The obtained results are scalable and can be generalized to pumping and wave systems of other sizes and powers using hydrodynamic, energy, and geometric similarity criteria. Usually, sizes of the flow domain are chosen in a practical range of pipe diameters 6, FIG. 1.

TABLE 2

| Baseline data. Pressure waves action. | | | | | | | | |
|---|---|---|---|---|---|---|---|---|
| j | $\overline{G}_{Wj}$ | $\overline{v}_{Wj}$ | $Re_{Wj}$ | $\mathcal{J}_{optj}$ | $I_{Wj}$ | $\overline{\omega}_j$ | $N_{PWj}$ | $\overline{P}_{SWj}$ | $\overline{P}_{DWj}$ |
| 1 | $\overline{G}_{W1}$ | $\overline{v}_{W1}$ | $Re_{W1}$ | $\mathcal{J}_{opt1}$ | $I_{W1}$ | $\overline{\omega}_1$ | $N_{W1}$ | $\overline{P}_{SW1}$ | $\overline{P}_{DW1}$ |
| 2 | $\overline{G}_{W2}$ | $\overline{v}_{W2}$ | $Re_{W2}$ | $\mathcal{J}_{opt2}$ | $I_{W2}$ | $\overline{\omega}_2$ | $N_{W2}$ | $\overline{P}_{SW2}$ | $\overline{P}_{DW2}$ |
| . | . | . | . | . | . | . | . | . | . |
| q | $\overline{G}_{Wq}$ | $\overline{v}_{Wq}$ | $Re_{Wq}$ | $\mathcal{J}_{optq}$ | $I_{Wq}$ | $\overline{\omega}_q$ | $N_{Wq}$ | $\overline{P}_{SWq}$ | $\overline{P}_{DWq}$ |
| . | . | . | . | . | . | . | . | . | . |
| n | $\overline{G}_{Wn}$ | $\overline{v}_{Wn}$ | $Re_{Wn}$ | $\mathcal{J}_{optn}$ | $I_{Wn}$ | $\overline{\omega}_n$ | $N_{Wn}$ | $\overline{P}_{SWn}$ | $\overline{P}_{DWn}$ |
| $\Psi$ | $I_{PWj}$ | $\overline{\Omega}_{Wj}$ | $N_{Wj}$ | $\overline{\lambda}_{Wj}$ | $\nabla_{Wj}$ | $E_{fj}$ | $\overline{E}_{fWj}$ | $E_{fj}$-$\overline{E}_{fWj}$ | |
| $\Psi$ | $I_{PW1}$ | $\overline{\Omega}_{W1}$ | $N_{W1}$ | $\overline{\lambda}_{W1}$ | $\nabla_{W1}$ | $E_{f1}$ | $\overline{E}_{fW1}$ | $E_{f1}$-$\overline{E}_{fW1}$ | |
| $\Psi$ | $I_{PW2}$ | $\overline{\Omega}_{W1}$ | $N_{W2}$ | $\overline{\lambda}_{W2}$ | $\nabla_{W2}$ | $E_{f2}$ | $\overline{E}_{fW2}$ | $E_{f2}$-$\overline{E}_{fW2}$ | |
| . | . | . | . | . | . | . | . | . | |
| $\Psi$ | $I_{PWq}$ | $\overline{\Omega}_{Wq}$ | $N_{Wq}$ | $\overline{\lambda}_{Wq}$ | $\nabla_{Wq}$ | $E_{fq}$ | $\overline{E}_{fWq}$ | $E_{fq}$-$\overline{E}_{fWq}$ | |
| . | . | . | . | . | . | | | | |
| $\Psi$ | $I_{PWn}$ | $\overline{\Omega}_{Wn}$ | $N_{Wn}$ | $\overline{\lambda}_{Wn}$ | $\nabla_{Wn}$ | $E_{fn}$ | $\overline{E}_{fWn}$ | $E_{fn}$-$\overline{E}_{fWn}$ | |

The main results of the simulation are the computed optimal values of frequencies and amplitudes of pressure waves, providing minimum value of the hydrodynamic resistance coefficient for any value of the flow velocity, belonging to the entire practical range. They are generalized to all fluid media with the same, or very close physical properties: density, dynamic viscosity, compressibility. Therefore, when using dynamic controllers in industrial pumping stations to provide an energy efficient mode of the process of pipeline transporting of fluid media with the above-mentioned physical parameters, these results are uploaded directly into the memory of the dynamic controllers. And intrinsic parameters of the pumping and wave systems are generated during their operation, then are added in the baseline file during the compiling. They can be taken as estimated reference data for calculation of the energy efficiency of real pipeline transporting process.

Therefore, main results can be used for pipelines of any configuration. Wherein, if the initial wave amplitude is not optimal, it can be non-essential corrected by the opening angle $\Psi$ of the control valve 13, to provide the energy efficient mode. The program used for the automatic controlling in real-time of the energy efficient mode of the process of pipeline transporting of fluid medium, provides a continuously optimal value of the control function, by processing the feedback data of the dynamic state of the controlled system, which is determined by the flow velocity. The control function is maintained in the optimal mode, $\mathcal{J}_{opt}$ providing minimum value of the hydrodynamic resistance coefficient, $\overline{\lambda}_{minWj}$ ($\mathcal{J}_{optj}$), and maximum energy efficiency, $\overline{E}_{fWj}$ for any values of the current flow velocity, $\overline{v}_{Wj}$ in the discharge pipeline.

In the process of automatic control of the energy efficient mode, only a part of the measured parameters is used, presented in Table 2 and FIG. 5. For example, the speed of the pressure wave generator motor, which determines the frequency of the generated pressure waves, is determined uniquely, both by using a tachometer 27 and by using an amperemeter or wattmeter. In the proposed method, the current in the PWG motor, τw is used in the process of automatic control of the energy efficient mode. Similarly, the current in the pump motor, $T_{PW}$ is used in this process. However, the use of the currents $T_W$ and $T_{PW}$ for this purpose does not in any way limit the use of the proposed method.

In the engineering system for pipeline transportation of fluid medium, FIG. 1, a method of automatic controlling of energy efficient mode of pipeline transporting process of fluid medium is carried out as follows:

The inlet section of the suction pipeline 5, FIG. 1 is immersed in a reservoir filled with fluid medium, in FIG. 1 it is not shown. The pump 3 and the system of measurement devices, FIG. 5 are turned on. Pumping system 1 is operated and the flow medium is transported through the suction pipeline 5, pump 2, and the discharge pipeline 6. A stationary pressure $P_S$ and a flow velocity $v_S$ are established on the inlet cross section of the suction pipeline $S_i$. The pressure $P_D$ and the flow velocity $v_D$ are established on the outlet cross section of the discharge pipeline $S_O$. The pump pressures $P_{sp}$ and $P_{dp}$ are established accordingly, on the inlet and on the outlet of the pump, providing the flow rate G, FIG. 5. For multistage centrifugal pumps, $S_S=S_D$, therefore $v_S=v_D$.

Pump operation mode is carried out by a dynamic controller 17. For example, a constant speed of the pump impeller or a constant current in the pump motor.

The PWG motor 9 is turned on and the pressure waves generator 8 starts to work, generating pressure waves. Speed of the motor is set to default which, usually, may not be optimal. The generated compression pressure wave propagates from the PWG through the connecting pipe 12 in the suction pipeline 5, FIG. 1. The rarefaction pressure wave propagates from the PWG through the connecting pipe 11 in the discharge pipeline 6. The interaction of the rarefaction pressure wave with the flow in the discharge pipeline 6, changes the structure of turbulence and boundary layer 36, FIG. 10. The hydrodynamic resistance coefficient, $\lambda_W$ decreases. As follows from the head-flow curve of the system, presented in FIG. 9, the flow rate is increased from $G_\lambda$ to $G_{\lambda w}$.

Measurement devices 25-32 are measuring instantaneous values of the:
speed of the pump motor, by tachometer 25;
current of the pump motor, by amperemeter 26;
speed of the PWG motor, by tachometer 27;
pressure on the inlet of the suction pipeline, by pressure meter 28;
flow rate of the fluid medium through the pumping system, by flowmeter 29;
discharge pressure on the beginning of the discharge pipeline, by pressure meter 30;
temperature of the fluid medium, by thermometer 31;
current of the motor of the PWG, by amperemeter 32.

Speed of the pump motor and of the PWG motor can be calculated by the standard voltage supplied to each motor and the measured current.

Values of measured parameters are determined by the internal dynamic state of the turbulent flow. Weak changes in the values of the turbulent flow parameters, the trend, occur in the vicinity of the average value of the measured quantity, for example, of the flow rate, $\overline{G}_W$. More significant changes of the flow rate (for example, by the operator), lead to the change of the average value. Thus, the turbulent flow as a controlled system is constantly in a dynamic state. Instantaneous values of all measured parameters are transmitted to the input module 18, FIG. 8. Then, the input module 18 converts the received data into digital format and transmits it to the microprocessor 33. The microprocessor 33 records all received current values of measured parameters into the database file, for example, Excel spreadsheet, in accordance with the sequence presented in TABLE 2. The program is built in such a way, that every m rows of the recorded current instantaneous values of the measured parameters are averaged. The result of averaging is recorded in the row (m+1). Each row with average values of parameters is also recorded in a separate file, for example, Excel spreadsheet. Let us name this file the file of average parameters. The arrangement of parameters in the columns of this file corresponds to TABLE 2. Rows with average values of parameters are written sequentially: M=1, 2 ... $M_T$. This is the basic file, based on which, the program performs all steps of the method of automatic controlling of the energy efficient mode of the process of pipeline transporting of fluid medium. To provide the specified method, the program links with all types of files: baseline file, database file, file of average parameters, and uses any needed parameters during the computing process. The program can also select and display on the screen of the dynamic controller any parameter from each of the above-mentioned types of files.

Note. Below we propose one of the schemes of the computational process to ensure an energy efficient mode, using the averaging time interval [m Δt]. However, for this purpose, one can use the other averaging time intervals that are multiples of [m Δt], for example, several averaging time intervals [mΔt]. In addition, during the computational process you can use data from any cell of the last recorded row of average values of measured parameters in the file of average parameters, regardless of the number of averaging time intervals used.

Let us consider, how the automatic control of an energy-efficient mode of the process of transporting a flow medium during the transition of the flow from one stationary state to another stationary state, with an insignificant change in the flow rate is performed.

Further, in the text all average measured parameters are accompanied by the subscript wx.

Let us assume that the process of pipeline transporting of fluid medium is carried out in the optimal mode. At the same time, the current values of the average parameters correspond to the last updated row (M−1) in the file of average parameters: $\overline{G}_{WXM-1}$, $\overline{v}_{WXM-1}$, $\overline{Re}_{WXM-1}$, $\mathcal{J}_{optWXM-1}$ ... $E_{f\,WXM-1}$.

In the file of average parameters, after an averaging time interval [mΔt], the following set of average parameter values is recorded, in accordance with the row M: $\overline{G}_{WXM}$, $\overline{v}_{WXM}$, $\overline{Re}_{WXM}$, $\mathcal{J}_{opt\,WXM}$ ... $E_{fWXM}$.

The search for the control function, $\mathcal{J}_{optWXM}$, corresponding to current state of the controlled system, i.e. the turbulent flow in the discharge pipeline with the flow state parameter $\overline{G}_{WXM}$ is a dynamic process. This dynamic process, performed by the program, is started as soon as row M is recorded in the file of average parameters. The implementation of this search is performed successively by the steps.

Let the measured average value of the flow rate be $\overline{G}_{WXM}$. Dividing $\overline{G}_{WXM}$ by the interval $\delta G_W$ we obtain:

$$\frac{\overline{G}_{wxM}}{\delta G_w} = p_M, \quad p_M = [p_M] + r_M \qquad (13)$$

$p_M$ is the quotient; $[p_M]$ is the integer part of the quotient, $[p_M]=0, 1, 2 \ldots n$, $r_M$ is the remainder, a fractional part of the quotient, $0 \leq r_M < 1$.

Comparison of the remainder $r_M$ and choice of the control function.

Let us assume that $[p_M]=j$. Then, depending on the value of $r_M$, for any j, the average value of the flow rate $\overline{G}_{WXM}$ can be located at different distances relatively to $\overline{G}_{Wj}$. For example, black circles in FIG. 6. The conditions proposed below determine all mentioned possible locations of the average values of the flow rate $\overline{G}_{WXM}$ and are represented schematically in FIG. 6.

1. $r_M \leq 0.5$ and $|\overline{G}_{Wj} - \overline{G}_{WXM}| < \Delta G_W$, then $\overline{G}_{WXM}$ is approximated by the average value $\overline{G}_{Wj}$;

2. $0.5 \leq r_M < 1$ and $\overline{G}_{WXM} < \overline{G}_{Wj} - \Delta G_W$, then $\overline{G}_{WXM}$ is approximated by the average value $\overline{G}_{Wj-1}$;

3. $0.5 \leq r_M < 1$ and $\overline{G}_{WXM} > \overline{G}_{Wj} + \Delta G_W$, then $\overline{G}_{WXM}$ is approximated by the average value $G_{Wj+1}$. (14)

Figure 11:
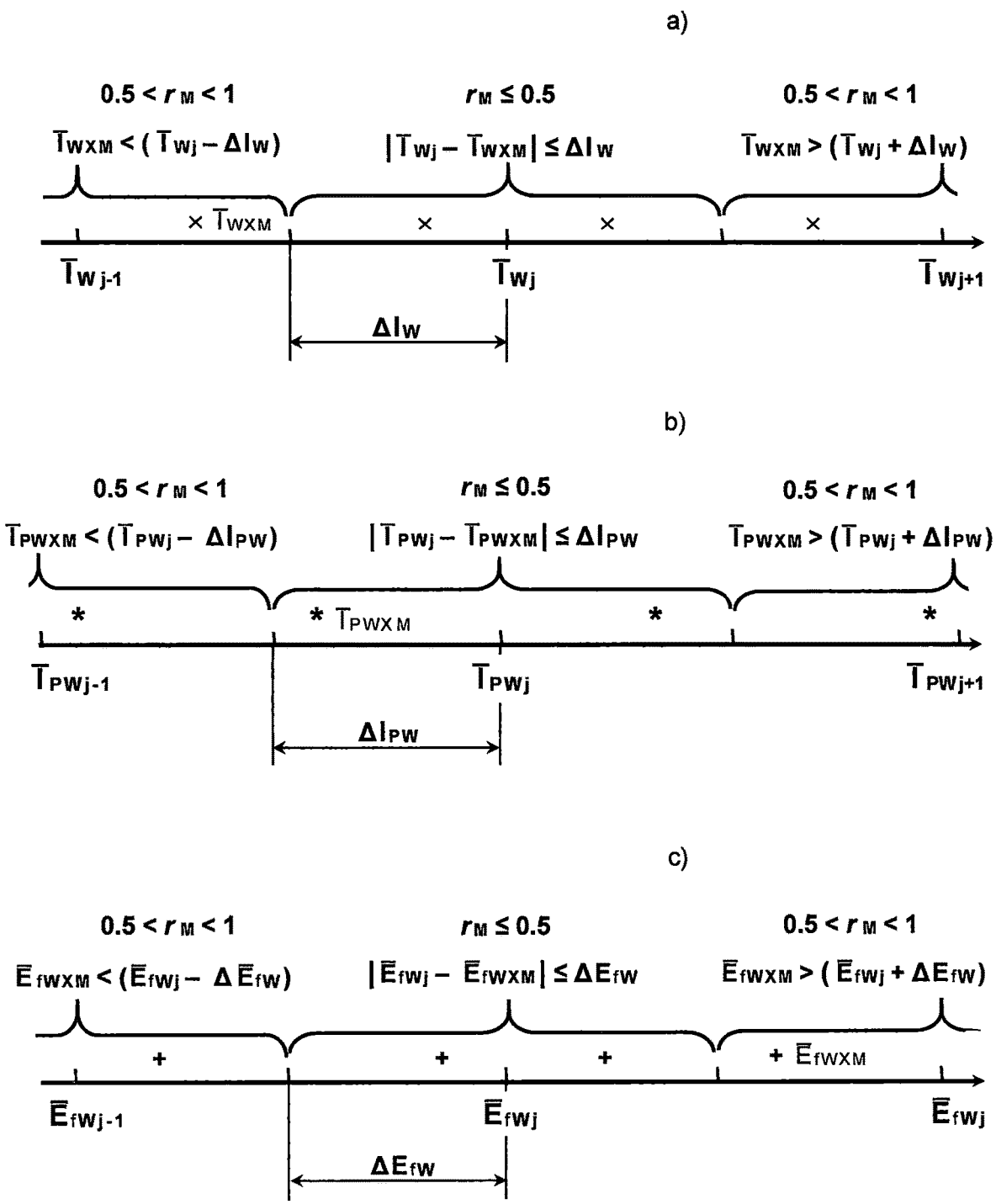
FIG. 11 is a schematic representation of the possible location of the average measured values of the current of the pump motor, a), current of the PWG motor, b), energy efficiency, c) relatively to average values: $T_{Wj}$, $T_{PWj}$, $E_{fWj}$, accordingly.

Conditions similar to (14) are satisfied by the average values of the measured current in the pump motor, current in the motor of pressure waves generator, and of the calculated energy efficiency. They are obtained by replacing the average flow rate in (14) with the average current in the pump motor, $T_{WXM}$, the average current in the motor of the pressure waves generator, $T_{PWXM}$, which determines the frequency of the generated pressure waves, $\mathcal{F}_{opt\ WXM}$, and the average value of energy efficiency, $\overline{E}_{fWXM}$. A schematic representation of the average values of these updated parameters, taken from the file of average parameters, is shown on the corresponding axes on the in FIG. 11.

a) possible location of the average values of the current of the pump motor, $T_{WXM}$, relatively to average value $T_{Wj}$, marked as x;

b) possible location of the average values of the current of the motor of PWG, $T_{PWXM}$, relatively to average value $T_{PWj}$, marked as *;

c) possible location of the average values of the energy efficiency, $\overline{E}_{fWXM}$ relatively to average value $\overline{E}_{fWj}$ marked as +.

The average values of the current of the pump motor, $T_{PW}$ and of the energy efficiency, $\overline{E}_{fW}$ directly depend on the average value of the flow rate, $\overline{G}_W$. Therefore, insignificant changes in flow rate affect proportionally the current in the pump motor and the energy efficiency, as also on the intervals $\Delta ID_W$ and $\Delta E_{fW}$. However, the average value of the current in the motor of pressure waves generator, $T_{PW}$ and value of the interval $\Delta I_{PW}$ depends on the average value of the flow rate, while the optimal frequencies of pressure waves weakly depend on average value of the flow velocity, and therefore, on the average value of the flow rate.

Practical execution of all steps in a logical sequence, which implementing a method of automatically controlling of energy efficient mode of the process of pipeline transporting of fluid medium, with any changes in flow rate, is described in detail below, flowchart of which is presented in FIG. 12. Separate numbering and naming of blocks in FIG. 12 is missing, since each block describes the performed action in sufficient detail. The combined block 37 can be considered as a separate block. The baseline file can be directly uploaded into the memory of the dynamic controller 17. In this case, the dynamic controller can be used in automatic control systems of energy efficient mode of the process of pipeline transportation of fluid media with the same viscosity. The remaining blocks presented in the flowchart on the FIG. 12, together with the baseline file, are consequently executed by the program, to provide the energy efficient mode. The combined block 37 can be built in the separate computing application and can be used to create the baseline file comprising results of simulation of the interaction of turbulent flow with pressure waves in a pipe, providing minimum hydrodynamic resistance for optimal values of frequencies and amplitudes of pressure waves.

The word "parameters" used in the blocks in FIG. 12 covers measured parameters, $G_{Wj}$, $I_{Wj}$, $I_{PWj}$, $P_{SWj}$, $P_{DWj}$ and calculated parameters, each of which, uses at least one measured parameter. For example, velocity of the flow, $v_{Wj} = G_{Wj}/S$. In the process of computing certain steps, in separate blocks, the only specific, specified parameters are used. The valve opening angle, $\Psi$ is not measured or calculated parameter. The amplitude of generated pressure waves is corrected by changing $\Psi$. All Measured and calculated parameters are recorded in the Table 2. Each row of averaged parameter values, over an averaging time interval, is also recorded in the file of average parameters.

The software implementation of the process of automatic control of energy efficient mode is shortly described below.

Let us consider, how the automatic control of the energy efficient mode of the process of transporting a flow medium during the transition from one stationary state to another stationary state, with an insignificant change in the flow rate is performed.

Let us use equality (13).

1. If $r_M = 0$, then $p_M = [p_M]$, the program automatically assigns to the subscript j the value $j = [p_M]$, activates the row, $j = [p_M]$ from the baseline file for the turbulent motion of the fluid medium in a discharge pipeline, interacting with pressure waves. When $\overline{G}_{WXM}$ belongs to the interval $\overline{G}_{WXM} \in [\overline{G}_{W[pM]} - \Delta G_W, \overline{G}_{W[pM]} + \Delta G_W]$, it is approximated by the value $\overline{G}_{W[pM]}$, in accordance with the $1^{st}$ condition of (14). Further, the average value of the current $T_{W[pM]}$ from the corresponding cell is transmitted in the digital format to the output module 19, where it is converted into analog signal and is transmitted to the automatic output controlled-device 20, which changes the optimal value of operating current of the motor 9 at the current value received from the output module 19, corresponding to optimal value of the frequency $\mathcal{F}_{opt\ W[pM]}$, at which the minimum value of the hydrodynamic resistance coefficient is achieved, $\dot{\lambda}_{WpXM} = \overline{A}_{WpXM\ min}$ ($\mathcal{F}_{opt\ W[pM]}$). If $\overline{\lambda}_{WpXM}$ satisfies the inequality $$|\overline{\lambda}_{WpXM} - \overline{\lambda}_{W[pM]}| < \Delta_{\lambda W}, \quad (15)$$

then the wave system 7 operates at these optimal parameters values during the averaging time interval $[m\Delta t]$. $\Delta_{\lambda W}$ is the maximum permissible value of the difference of hydrodynamic resistance coefficients. Inequality (8) imposes the following condition on energy efficiency:

$$|\overline{E}_{fWPXM} - (\overline{E}_{fW[pM]})^{in}| < \Delta_{EX}, \quad (16)$$

Figure 13:
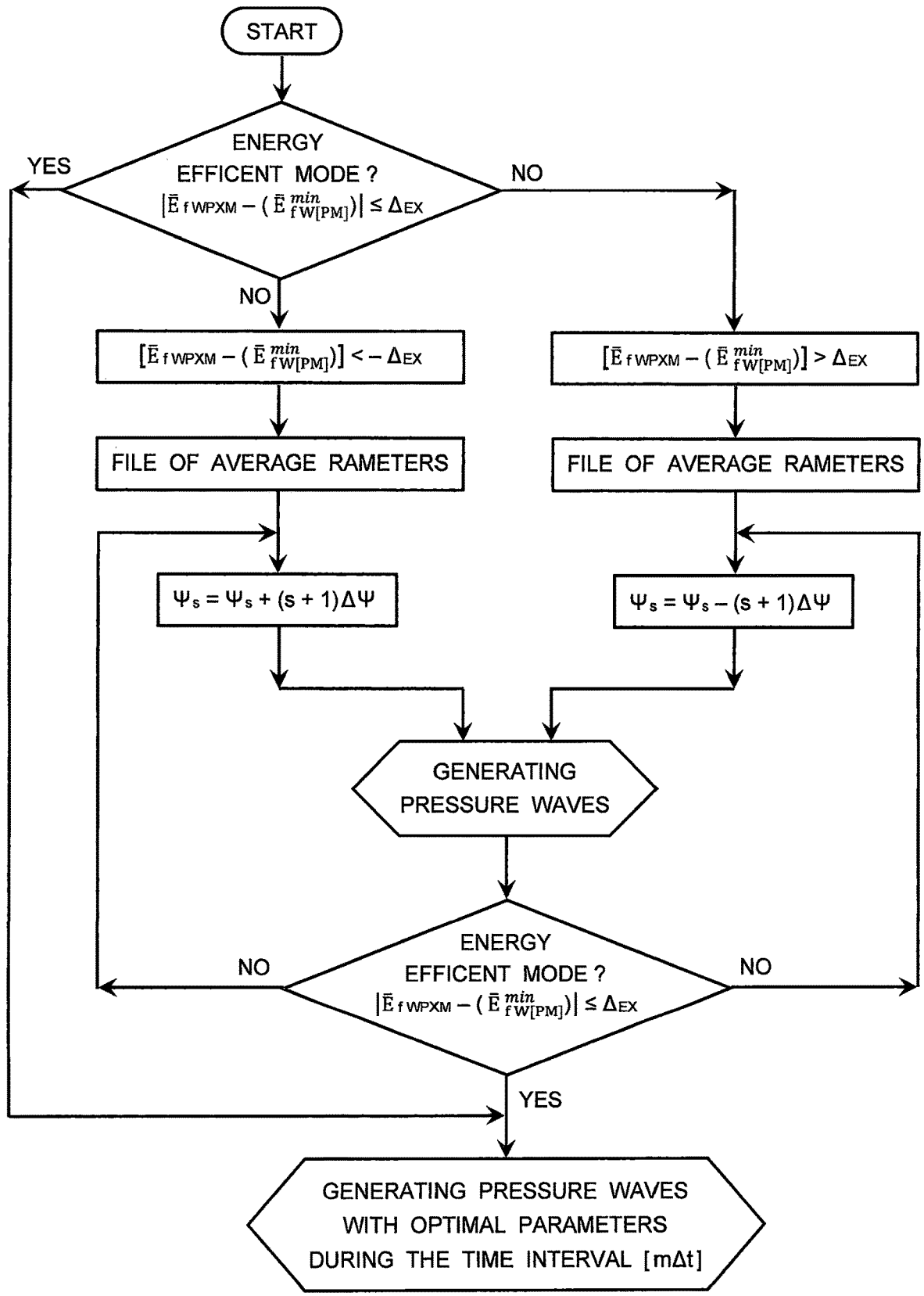
FIG. 13 is a flowchart illustrating automatic correction of the amplitude of pressure waves providing the energy efficient mode during the process of pipeline transportation of fluid medium.

$\Delta_{EX}$ is the maximum permissible value of the difference of the energy efficiencies. Physical conditions (15) provide practical conditions (16). The control of fulfillment conditions of the energy efficient mode, is performed by last block of the flowchart in FIG. 12, b. This is carried out by the variation of the valve opening angle $\Psi$, proposed in the flowchart of FIG. 13.

If $\overline{\lambda}_{WpXM}$ differs significantly from $\overline{\lambda}_{W[pM]}$, i.e. ($\overline{\lambda}_{WpXM} - \overline{\lambda}_{W[pM]}) > \Delta_{\lambda W}$, and therefore, inequality (16) also changes sign, then the amplitude of generated pressure waves is corrected by changing the valve opening angle N of the control valve 13, until the condition (16) is satisfied. For example, the valve opening angle is discretely increasing relatively to a default value, $\Psi_D$ with the constant step $\Delta\Psi$.

If at the same time the $\overline{\lambda}_{WpXM}$ is increasing, then the direction of the valve opening angle changes in reverse; the valve opening angle $\Psi$ is decreasing. Moreover, after each step of decreasing the opening angle, $\Psi_s=\Psi_0-s^*(\Delta\Psi)$, the energy efficiency, $\overline{E}_{fWPXM}$ is compared using the inequality (16); s=1, 2 . . . S, S is the number of the discrete steps of the change of the opening angle $\Psi$; $\Psi_0$ is the default value of the valve opening angle. As soon as the condition (16) is satisfied, the valve opening angle is no longer changed and the wave system 7 is working during the averaging time interval [m $\Delta$t] in the optimal mode, with optimal parameters of the row j: j=[$p_M$] of the baseline file, providing the energy efficient mode.

1.1. If $0<r_M\leq0.5$, and $\overline{G}_{WXM}$ belongs to the interval $\overline{G}_{WXM} \in [\overline{G}_{W[pM]}-\Delta G_W, \overline{G}_{W[pM]}+\Delta G_W]$, then j=[$p_M$] and $\overline{G}_{WXM}$ is approximated by $\overline{G}_{W[pM]}$, in accordance with the 1$^{st}$ condition of (14). The row j=[$p_M$] in the baseline file remains activated. The current $T_{PW[pM]}$ in the PWG motor 9 remains the same and, consequently, the optimal frequency $\mathcal{J}_{optW[pM]}$ of the generated waves also does not change. Thus, when the average values of the flow rate are located within the interval $\pm\Delta G_W$ relatively to the average value $G_{W[pM]}$ (weak trend of the stationary flow), the control function $\mathcal{J}_{opt}$ w [$_p$, M] is in a dynamic state, slightly changing in the vicinity of the optimal value, $\mathcal{J}_{optW[pM]}$, the 1$^{st}$ condition of (14), but being applied to optimal frequency.

The state of the controlled system with the flow rate $\overline{G}_{W[pM]}$ whose control function is determined by $\mathcal{J}_{optW[pM]}$ is quasi-stationary, or formally stationary, during the average time interval [m$\Delta$t]; while the energy efficiency reaches the minimum value, $\overline{E}_{fW[PM]}^{min}$.

2. If $0.5<r_M<1$, and the average current value of the flow rate satisfies the inequality, $\overline{G}_{W[pM]}+r_M<\overline{G}_{W[pM]}-\Delta G$ w, then $G_{W[pM]+rM}$ is approximated by the 2$^{nd}$ condition of (14), $\overline{G}_{W[pM]-1}$. The program automatically assigns to the subscript j the value: j=[$p_M$]−1 and activates the row j=[$p_M$]−1 from the baseline file. Further, the average value of the current $T_{PW[p1]-1}$ from the corresponding cell is transmitted to the output module 19, then, is converted into analog signal, and is transmitted to the output-controlled device 20. It sets new optimal value of the current $T_{PW[p1]-1}$ in the PWG motor 9. Speed of the PWG motor is adjusted to the new value of the current, $T_{PW[pM]-1}$, and therefore the optimal frequency of the generated pressure waves is adjusted to its new value $\mathcal{J}_{opt\ w[pM]-1}$, at which the minimum value of the energy efficiency is reached, $\overline{E}_{fWxM}=\overline{E}_{fW}^{min}$. If $E_{fW\ [pM]-1}$ satisfies the inequality (16), then the wave system 7 operates at these optimal parameter values during the averaging time interval [m $\Delta$t]. If inequality (16) is not satisfied, the amplitude of the generated pressure waves is corrected by varying the valve opening angle $\Psi$ of the control valve 13, until the condition (16) is satisfied. Performing of this procedure is described above.

3. If $0.5<r_M<1$, and the average current value of the flow rate satisfies the inequality, $\overline{G}_{W[pM]+rM}>\overline{G}_{W[pM]}+\Delta G_W$, then $\overline{G}_{W[pM]+rM}$ is approximated by the 3$^{rd}$ condition of (14), $\overline{G}_{W[pM]+1}$. The program automatically assigns to the subscript j the value: j=[pM]+1 and activates the row j=[$p_M$]+1 from the baseline file. Further, the average value of the current $T_{PW[pM+1]}$ from the corresponding cell is transmitted to the output module 19, then it is transmitted to the output-controlled device 20. It sets new optimal value of the current $T_{PW[pM]+1}$ in the PWG motor 9. The PWG motor speed is adjusted to the new current values, $T_{PW[pM]+1}$, and therefore the optimal frequency of the generated pressure waves is changed to its new value $\mathcal{J}_{opt\ w[pM]+1}$, at which the minimum value of the energy efficiency is reached, $\overline{E}_{fWxM}=$ $\overline{E}_{fWXM}^{min}$. If $\overline{E}_{fW[pM]+1}$ satisfies the inequality ($\overline{E}_{fWxM}$ $-\overline{E}_{fW\ [pM]+1})<\Delta_{EX}$, then the wave system 7 operates at these optimal parameters values during the average time interval [m $\Delta$t]. If inequality (16) is not satisfied, the wave amplitude is corrected by varying the valve opening angle $\Psi$ of the control valve 13 by controlled-device 21, until condition (16) is satisfied. Performing of this procedure is described above.

Such insignificant adjustment of the values of control function between the average value $\mathcal{J}_{opt\ w[pM]}$ and neighboring values $\mathcal{J}_{opt\ w[pM]-1}$ and $\mathcal{J}_{opt\ w[pM]+1}$ is usually realized in a quasi-stationary flow, when the flow rate smoothly oscillates (trend) between the neighboring values of $\overline{G}_{W[pM]-1}$ and $\overline{G}_{W[pM]+1}$ relatively to average value $\overline{G}_{W[pM]}$.

Similar relationships are obtained for average values of flow velocities, when replacing the flow rate $\overline{G}$ to $\overline{v}^*S$ in equality (13). Therefore, the proposed analysis in terms of the average values of the flow rate is also valid in terms of the average values of the flow velocity.

Let us assume, that the current values of the flow rate in the discharge pipeline equal to $\overline{G}_{WXA}$ and is carried out in an energy efficient mode. Suppose, that as a result of technological needs, the flow rate is changed. The new value of the steady flow becomes $\overline{G}_{WXB}$. The change in flow rate from $\overline{G}_{WXA}$ to $\overline{G}_{WXB}$ is a transitional process. It is carried out in the time interval $\Delta t_x$, called a transition period, which depends on the value of the difference $\overline{G}_{WXB}-\overline{G}_{WXA}$ and its velocity. Moreover, a period of the transient process is much more than the averaging time interval: $\Delta t_x >> $[m$\Delta$t]. The program automatically performs all actions, in order to provide the energy efficient mode, using only parameters received from the measurement devices. The average values of the measured flow rate, during the transition period $\Delta t_x$, change discretely, and after each averaging time interval [m$\Delta$t] a new set of transitional values of the flow rate is generated: $\{\overline{G}_{WXh}\}$, h=A, A+1, A+2 . . . B−1, B; or, $\{\overline{G}_{WXA}, \overline{G}_{WXA+1}, \overline{G}_{WXA+2} \ldots \overline{G}_{WXB-1}, \overline{G}_{WXB}\}$.

Assume, that the first measured value of the transient flow rate is $\overline{G}_{WXA+1}$. Dividing by the interval $\delta\overline{G}_W$ we obtain:

$$\frac{\overline{G}_{WXA+1}}{\delta\overline{G}_W} = p_{A+1}, \; p_{A+1} = [p_{A+1}] + r_{A+1}, \; h = A+1. \quad (17)$$

The structure of the division result (17) is similar to (13) but in different notations. $p_{A+1}$ is the quotient, $p_{A+1}=$ [$p_{A+1}$], $0<r_{A+1}<1$. Therefore, the steps of searching and selecting the value of the control function, $\mathcal{J}_{opt\ wXh}$, and transmitting the value of the optimal current to the output module 19 of the dynamic controller 17, are similar with the described above comparisons 1-4 of the fractional part of the quotient, $0\leq r_h<1$.

If $r_{A+1}$=0, then $p_{A+1}$=[$p_{A+1}$], and the subscript j is assigned a value [$p_{A+1}$]: j=[$p_{A+1}$]. $\overline{G}_{WXA+1}\in [\overline{G}_{W[pA+1]}-\Delta G_W, G_{W[pA+1]}+\Delta G_W]$ in accordance with the 1$^{st}$ condition of (14).

If $0\leq r_{A+1}\leq0.5$ and $\overline{G}_{WXA+1}\in [\overline{G}_{W[pA+1]}-\Delta G_W, \overline{G}_{W[pA+1]}+\Delta G_W]$ then the subscript j is assigned a value [$p_{A+1}$]: j=[$p_{A+1}$]. For both cases, $r_{A+1}$=0 and $0\leq r_{A+1}\leq0.5$, $\overline{G}_{WXA+1}$ is approximated by $\overline{G}_{W[pA+1]}$.

The program automatically activates the row j=[$p_{A+1}$] from the baseline file, and performs sequentially the following steps:

1. transmitting value of the current $T_{W[pA+1]}$ from the corresponding cell to the output module 19;
2. transmitting value of the current $T_{W[pA+1]}$ from the output module 19 to the output-controlled device 20;

3. re-setting the optimal value of the current of the PWG motor 9;
4. providing the generating pressure waves of optimal frequency, $\mathcal{F}_{opt W[pA+1]}$;
5. reaching the minimum value of the hydrodynamic resistance coefficient, $\hat{\lambda}_{W[pA+1]min}$;
6. checking the condition (16);
7. correcting the amplitude of pressure waves by varying the valve opening angle $\Psi$, of the control valve, for example, 13, by controlled-device 21, if necessary.
8. providing the energy efficient mode of the process pipeline transporting of fluid medium.

Detailed of performing steps 1-8 is described above.

If $0.5 \leq r_{A+1} < 1$, and the average current value of the flow rate satisfies the inequality, $\overline{G}_{WX[pA+1]} + r_{A1+1} < \overline{G}_{W[pA+1]} - \Delta G_W$, then $\overline{G}_{WX[pA+1]} + r_{A+1}$ is approximated by $\overline{G}_{W[pA+1]-1}$, the $2^{nd}$ condition of (14). The program automatically assigns to the subscript j the value: $j = [p_{A+1}] - 1$, activates the row $j = [p_{A+1}] - 1$ from the baseline file, and performs sequentially the above steps 1-8.

If $0.5 < r_{A+1} < 1$, and the average current value of the flow rate satisfies the inequality, $\overline{G}_{WX[pA+1]+rA+1} > \overline{G}_{W[pA+1]} + \Delta G_W$, then $\overline{G}_{WX[pA+1]+rA+1}$ is approximated by the $3^{rd}$ condition of (14), $\overline{G}_{W[pA+1]+1}$. The program automatically assigns to the subscript j the value: $j = [p_{A+1}] + 1$, activates the row $j = [p_{A+1}] + 1$ from the baseline file, and performs sequentially the above steps 1-8.

Similar computational steps are performed automatically by the program for the entire set of transitional values of flow rate: $\{\overline{G}_{WXA}, \overline{G}_{WXA+1}, \overline{G}_{WXA+2} \ldots \overline{G}_{WXB-1}, \overline{G}_{WXB}\}$. When the transitional values of flow rate $\overline{G}_{WXAh}$ get closer to the next stationary value $\overline{G}_{WXB}$, h=A, A+1 ... B-1, B, the difference between two successive values $\overline{G}_{WX[Ah]} - \overline{G}_{WX[Ah]-1}$ becomes quite small. The flow state $\overline{G}_{WXh}$ at h=B is stationary. At the same time, the computational steps for choosing the optimal frequencies, $\mathcal{F}_{opt\, W\,[Ah]}$ are carried out sequentially, as described above.

Providing the energy efficient mode is performed using a program, that analyzes, compares, computes, and continuously adjusts the value of the control function, $f_{opt}$, to the current state of the controlled system.

To compare the energy efficiency of the action of pressure waves on the process of pipeline transporting of fluid medium, formula (1) is used. Comparative results calculated using the intrinsic parameters of the pumping system (the action of the constant pressure on a turbulent flow) and of the intrinsic parameters of the pumping and wave systems (the action of pressure waves on a turbulent flow), presented in the TABLE 2.

Thus, in the proposed engineering system, the method of automatic controlling of the energy efficient mode of the process of pipeline transporting of fluid medium is provided in real time in both, stationary and non-stationary turbulent flows. In other words, the proposed energy efficient mode provides in real-time the optimal value of the control function for both the stationary state of the controlled system and for any transient states.

The proposed engineering system for pipeline transportation of fluid medium and method of automatic controlling of the energy efficient mode can be successfully used for pipeline transportation of technological media, brines, different heterogeneous media, whose solid particles are sedimented on the inner surface of a pipe, and form a solid phase layer. The formation of such a layer leads to the decrease in the cross-sectional area of the flow, an increase in power of the pump motor, and a decrease in flow rate. The energy costs of operating such pipelines become economically unprofitable.

The use of the system of generating pressure waves 15 in relation to the transportation of such media has the following advantage:
  reducing the rate of sedimentation of solid particles on the inner surface of the pipe, due to longitudinal sign alternating acceleration of the elementary fluid particles in the field of the pressure wave;
  increasing the life of pipeline.

Prevention of decrease in sedimentation of solid particles is ensured not only by the frequency of pressure waves, but also by their form and amplitude. Even a small increase in the service life of pipes in industrial conditions is very important from economic standpoint. For example, in salt production factories, certain technological processes are accompanied by pumping brines at a temperature of 203° F. After about six months of operation, the cross-sectional area of the flow in this pipeline is significantly reduced. The specific energy consumption is increased and pipeline operation becomes unprofitable. These pipes are replaced with new ones.

A baseline file similar to the one described in the method is used in control systems for certain industries. For control systems in such industries, the baseline file is similar to the one presented in the described method. A separate column in the baseline file must be added, to visualize the dynamics of specific energy consumption on a daily or even hourly basis. As soon as this parameter reaches the upper limit, determined by the energy efficiency, the dynamic controller sends an alert signal to the operator. The pumping system can be stopped automatically or by the operator.

The modern filtration systems, for example, wastewater filtration systems, are operating only under the action of the constant pressure. The main problem in the modern wastewater filtration technology is the relatively quick filter clogging and filter cake forming. Consequently, the filter hydrodynamic resistance is increased. The pump power, and specific energy consumption to maintain the same flow rate, are also increased. Frequent filters replacements are relatively expensive. Therefore, at least a slight extension of the filter life, with acceptable energy efficiency, is economically profitable.

The proposed engineering system and method of automatic controlling of the energy efficient mode can be successfully used in the wastewater filtration technology. In such case, in engineering system FIG. 2, a filter is installed behind the conjugated surface $S_J$ downstream, FIG. 9 (filter is not shown).

Longitudinal sign-alternative wave action on the filter cake, maintains it in unstable, loosened state; the state with more porosity. This state increases the performance of the filter and filtration efficiency. In addition, periodical action of pressure to the impurities within the filter itself, prevents their coagulation and settling on the pore walls, or solid filter particles, i.e., slowing down the filter clogging. Both these pressure wave actions lead to an increase in the life of the filter.

For some filtration systems the PWG can be connected parallel to the filter.

For filtration processes, the wave system 7 must generate pressure waves of such form and amplitude as to minimize the hydrodynamic resistance of the current state of the controlled system, new filter, and the filter cake. The optimal form, amplitude, and frequency of pressure waves for a given filter material and types of wastewater impurities is determined as a result of modeling and further experimental correction. This data forms the basis of the baseline file. Essentially, it is a table function $f_{opt\,fj}(\alpha, P^-(t), \overline{P}_{fj})$, where $\overline{P}_{fj}$ is the average value of the inlet pressure on the filter; this is the main technological parameter of the filtering process; $f_{opt\,fj}$ is the optimal value of the control function of the filter system: filter and filter cake; $P^-(t)$ is the law of change of pressure versus time in the generated wave. As applied to the filtration process, the TABLE 2 is modified. Some parameters are removed, for example, Reynolds number, average flow velocity. In the second column, the flow rate, $\overline{G}_{Wj}$ is replaced to the main technological parameter of the filtering process, $\overline{P}_{fj}$. Further, all n rows in the baseline file are sorted in ascending order of the average values of the inlet pressure on the filter $\overline{P}_{fj}$: $\overline{P}_{f1} < \overline{P}_{f2} < \ldots < \overline{P}_{fn}$. Besides, the interval between two consecutive average values of the inlet pressure is the same and is equal to $\delta\overline{P}_{fW}$. The energy efficiency of the filtration process is determined by formula (1), where the denominator is the volume of filtered liquid over the time interval $\Delta\tau_G$.

It will be understood that the proposed engineering system with such dynamic controller, with an installed program and baseline file of technological parameters of the microprocessor and memory is provided by way of example but not limitation, and embodiment of the present invention can be used in engineering systems for pipeline transporting of fluid media with more complicated properties, and in other technological processes with changeable parameters, for the purpose of automatic controlling of energy efficient mode. Moreover, the control function does not necessarily have to be of the optimal value of frequency of generated pressure waves. For some technological applications, the form of pressure wave or amplitude may be optimal. Ultimately, the amplitude-frequency characteristics of the wave are important. It is the dynamics of pressure changes in the wave that determines the energy efficiency of the wave's impact on the controlled system. Performing such action on the controlled systems by pressure waves of various forms and amplitudes is ensured by the frequency of the generated waves, which are automatically controlled by the speed of pressure waves generator.

What is claimed is:

1. An engineering system for pipeline transporting process of fluid medium comprising systems:
   a pumping system, comprising:
      a pump, having an inlet and an outlet, a suction pipeline and a discharge pipeline, wherein the inlet is connected to the suction pipeline and the outlet is connected to the discharge pipeline, a motor, coupled to a pump,
         the pumping system is configured to pump flow medium through the suction pipeline, the pump, and the discharge pipeline;
   a wave system, comprising:
      a pressure waves generator, a motor, connected to the pressure waves generator, connecting pipes connecting the pressure waves generator parallel to the pump, to the suction pipeline and the discharge pipeline,
         the wave system is configured for generating pressure waves;
   a system for generating pressure waves, formed from the interconnected the pumping system and the wave system,
      configured in such a way, that during the operating pumping system and wave system, pressure waves are generating by pressure waves generator, and propagating through the medium flow in the connecting pipes, the suction pipeline, and the discharge pipeline;
   a system of measurement devices, comprising:
      measurement devices set on the elements of the system for generating pressure waves, connected to an input module of a dynamic controller, and
      configured for measuring current values of operating parameters of the turbulent flow, of the motor of pressure waves generator, and of the pressure waves;
   a dynamic controller, connected to the feedback of the system for generating pressure waves, comprising:
      a microprocessor, a memory, an input module, an output module, output-controlled devices, a programming device;
         the input module is connected to measurement devices;
         the microprocessor is interconnected to the input module, the memory, the programming device, and the output module;
         the output module is connected to the output-controlled devices;
         the dynamic controller is configured for providing in real-time the automatic controlling of energy efficient mode of the process of pipeline transporting of fluid medium through the pumping system.

2. The engineering system according to claim 1, wherein the ratio of the cross-sectional area of the connecting pipe to cross-sectional area of the discharge pipe is less than 0.04.

3. The engineering system according to claim 1, wherein each of connecting pipe of the pressure waves generator is equipped with a controlled valve.

4. The engineering system according to claim 3, wherein each control valve is connected to the input module of the dynamic controller.

5. A method of automatic controlling of energy efficient mode of the process of pipeline transporting of fluid medium performed by the engineering system, comprising the steps of:
   computing the optimal average values of frequencies of pressure waves interacting with turbulent flow in a pipe, providing the minimum average values of the hydrodynamic resistance coefficient for a discrete set of current average values of the flow velocities, covering an entire practical range;
   experimental checking and correcting of the computed minimum average values of the hydrodynamic resistance coefficient at average values of optimal frequencies of generated pressure waves, for the discrete set of said average values of the flow velocities;
   compiling the baseline file containing:
      a discrete set of said average values of the flow velocities;
      a discrete set of the average values of computed and experimentally corrected minimum values of the hydrodynamic resistance coefficient at average values of optimal frequencies of generated pressure waves for said discrete set of current average values of the flow velocities;
   uploading the baseline file in the memory of the dynamic controller;
   measuring current values of the flow velocity, current of the pressure waves generator motor, optimal frequencies of generated pressure waves, and pressures in the discharge pipeline and in the suction pipeline;
   transmitting the current values of said measured parameters to the input module;

converting the transmitted current values of said measured parameters in the digital format by the input module;

transmitting the digital format of said measured parameters to the microprocessor;

providing receiving, recording, processing, calculating, and saving current values of the flow velocity, current of the pressure waves generator motor, optimal frequencies of generated pressure waves, and pressures in the discharge pipeline and in the suction pipeline, by the microprocessor;

averaging the received current values of the flow velocity, current of the pressure waves generator motor, optimal frequency of generated pressure waves, pressures in the discharge pipeline and suction pipeline, and calculated parameters at each specified time interval;

compiling the file of average parameters containing updated average values of the flow velocity, current of the pressure waves generator motor, optimal frequencies of pressure waves, and pressures in the discharge pipeline and in the suction pipeline;

selecting the row in the baseline file, considering pressure waves action on the turbulent flow, in which the average value of the flow velocity is closest to the last updated average value of the flow velocity from the file of average parameters;

transmitting average value of the current of pressure waves generator motor from the selected row of said baseline file to the output module;

converting the received average value of the current of pressure waves generator motor into analog signal;

transmitting the value of analog signal to the automatic controlled-device;

changing the value of operating current of the motor of pressure waves generator motor to the transmitted optimal average value of the current, from the baseline file, corresponding to current value of the flow velocity in the discharge pipeline, optimal frequency of pressure waves, and minimum value of the hydrodynamic resistance coefficient;

providing the energy efficient mode of the process of pipeline transporting of fluid medium.

6. The method according to claim 5 wherein the correcting amplitude of generated pressure waves is performed by variation of the valve opening angle.

* * * * *